United States Patent [19]
Kusaka

[11] Patent Number: 5,563,678
[45] Date of Patent: Oct. 8, 1996

[54] FOCUS DETECTION DEVICE AND METHOD

[75] Inventor: Yosuke Kusaka, Kanagawa-ken, Japan

[73] Assignee: Nikon Corporation, Tokyo, Japan

[21] Appl. No.: 449,074

[22] Filed: May 24, 1995

[30] Foreign Application Priority Data

Jun. 6, 1994 [JP] Japan .................. 6-124020
Jun. 6, 1994 [JP] Japan .................. 6-124021

[51] Int. Cl.$^6$ .................................... G03B 13/36
[52] U.S. Cl. ..................... 396/121; 396/125; 396/147
[58] Field of Search ....................... 354/402, 406, 354/407, 408, 409; 250/201.2, 201.7, 201.8

[56] References Cited

U.S. PATENT DOCUMENTS

| | | | |
|---|---|---|---|
| 4,816,663 | 3/1989 | Utagawa et al. | 354/402 X |
| 4,859,842 | 8/1989 | Suda et al. | 354/408 X |
| 4,949,116 | 8/1990 | Karasaki et al. | 354/408 |
| 4,992,819 | 2/1991 | Ohtaka et al. | 354/408 |
| 5,068,737 | 11/1991 | Taniguchi et al. | 354/400 X |
| 5,084,722 | 1/1992 | Taniguchi et al. | 354/402 |
| 5,233,173 | 8/1993 | Moriyama | 354/406 |
| 5,277,062 | 1/1994 | Blauch et al. | 73/153 |
| 5,311,241 | 5/1994 | Akashi et al. | 354/402 |
| 5,373,342 | 12/1994 | Utagawa | 354/402 |
| 5,473,403 | 12/1995 | Suda et al. | 354/409 |
| 5,485,003 | 1/1996 | Kusaka | 354/408 X |
| 5,499,074 | 3/1996 | Ohsawa et al. | 354/402 |

*Primary Examiner*—W. B. Perkey
*Attorney, Agent, or Firm*—Oliff & Berridge

[57] ABSTRACT

A focus detection device and method for a camera or the like detects focus adjustment conditions in a strip type focus detection areas. The areas do not contain an intersection of the image field and the optical axis of the photo-optical system but are radially and tangentially oriented with respect to concentric circles centered at the intersection. At least two strip-type areas are provided. The focus detection operation in a first focus detection area has a high accuracy of focus detection and a smaller chance for an eclipse to occur in the focus detection light rays. This area has priority over the focus detection operation of a second focus detection area. The device may also mathematically process the focus detection.

36 Claims, 16 Drawing Sheets

FOCUS DETECTION DEVICE AND METHOD

FIELD OF THE INVENTION

The invention relates to a focus detection device used in a photo-optical system, such as a camera and the like. The focus detection device detects a focus condition of an image in the photo-optical system.

DESCRIPTION OF RELATED ART

Focus detection devices for forming a subject image on a specified photographic or image field in a photo-optical system are known. These devices include a first strip type focus detection area and a second strip-type focus detection area defined on the image field. The first focus detection area is defined without containing the intersection of the image field and the optical axis of the photo-optical system, but is positioned tangentially with respect to concentric circles centered at the intersection of the image field and the optical axis or field center. The second focus detection area is defined without containing the field center or intersection of the image field and the optical axis, but is radially oriented with respect to concentric circles centered at the field center.

In the conventional focus detection devices, an eclipse of the focus detection light rays can occur due to the placement of the focus detection area, with respect to the field center or the intersection of the optical axis and the image field. The eclipse is not considered in processing a focus detection algorithm and therefore, the focus detection results. A problem occurs in that an error is generated in the focus detection results if an eclipse takes place in the focus detection light rays.

SUMMARY OF THE INVENTION

A focus detection device determines the focus condition for a photo-optical system defining an optical axis. The device comprises a strip type first focus detection area that is provided on an image field of the photo-optical system, without containing an intersection of the image field and the optical axis, and is oriented intersection. A strip type second focus detection area is provided on the image field without containing the intersection and is radially oriented to concentric circles centered at the intersection. A first focus detection means is provided for detecting the focus adjustment condition of the photo-optical system in the first focus detection area. It detects the focus adjustment condition using a pair of light rays passing through the photo-optical system. A second focus detection means detects the focus adjustment condition of the photo-optical system in the second focus detection area using another pair of light rays passing through the photo-optical system. Control means cause the focusing detection operation of the first focus detection means to have priority over the focus detecting of the second focus detection means and detecting the focus adjustment condition of the photo-optical system in the strip type first focus detection area before detecting the focus adjustment condition in the strip type second focus detection area.

The first and second detection areas have specific and predetermined geometrical relationships to each other in order for the determination to take place. In addition to their relationship with respect to concentric circles, the areas have certain relationships to each other.

Further, the focus adjustment condition may be determined using different mathematical processing for the first and second strip type detection areas.

An object of the invention is to provide a focus detection device with improved focus detection accuracy for the image field's focus detection area.

BRIEF DESCRIPTION OF THE DRAWINGS

The figures are used in describing the structure of the invention for the understanding, but the invention is not limited in any way to the disclosed embodiments.

DETAILED DESCRIPTION OF PREFERRED EMBODIMENTS

Figure 1:
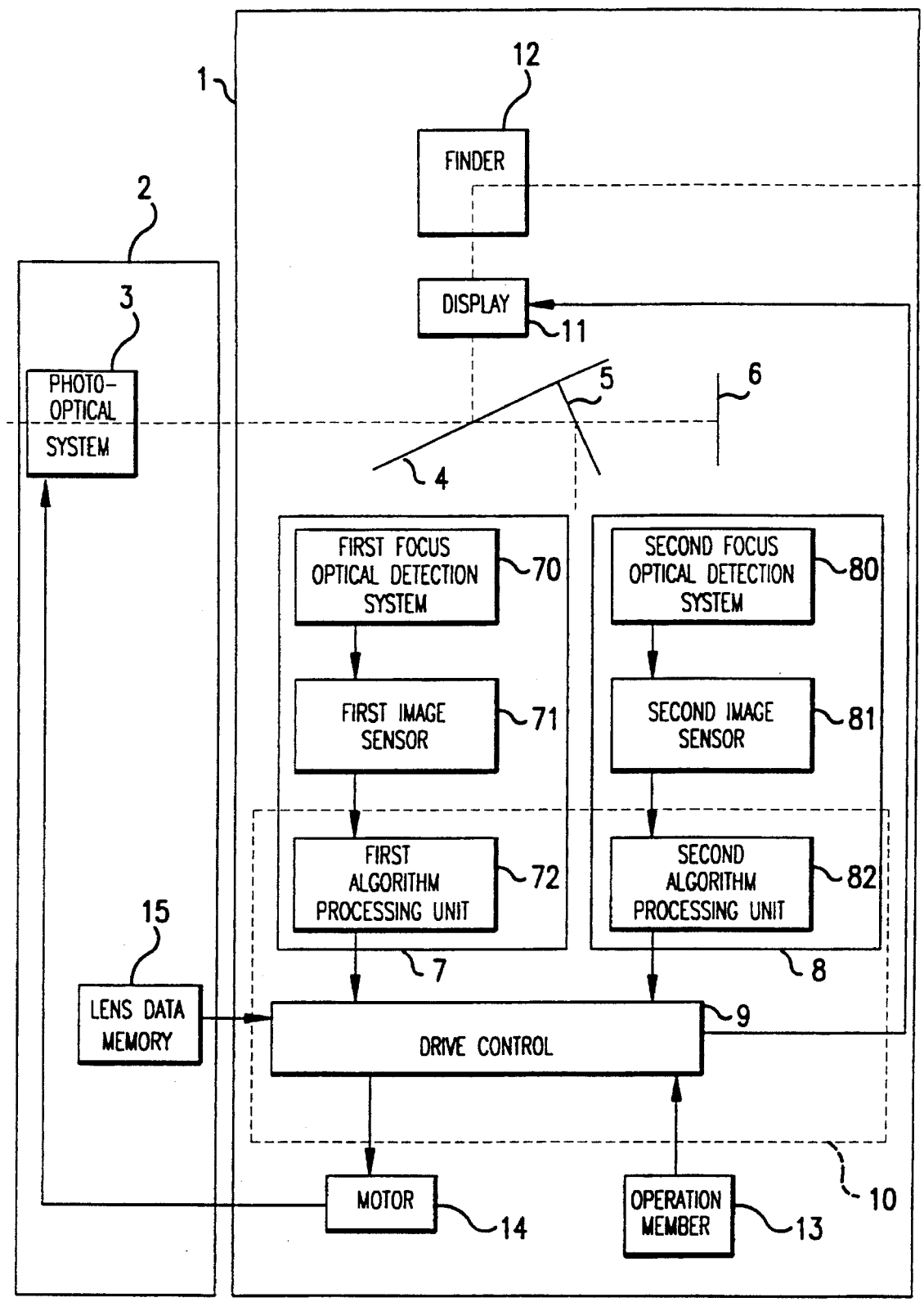
FIG. 1 is a schematic block diagram illustrating the focus detection device in a camera according to a first embodiment of the invention.

FIG. 1 is a schematic block diagram of a camera having a focus detection device. An interchangeable lens barrel 2 is mounted on a camera body 1. The lens barrel 2 includes a photo-optical system 3. Light rays from the subject pass through the photo-optical system 3 and are divided by a main mirror 4. The main mirror 4 includes half mirrors in the direction of sub-mirror 5 and a finder 12.

Light rays that are deflected towards the bottom of the camera body 1 are focus detection light rays. The focus detection light rays are guided to the first and second focus detection units 7 and 8, respectively. The first and second focus detection units 7 and 8 are placed near the predicted focus surface, close to the film surface or image field 6. The first focus detection unit 7 includes a first focus detection optical system 70, a first image sensor 71 and a first algorithm processing unit 72. The second focus detection unit 8 is composed of a second focus detection optical system 80, a second image sensor 81 and a second algorithm processing unit 82.

Figure 2:
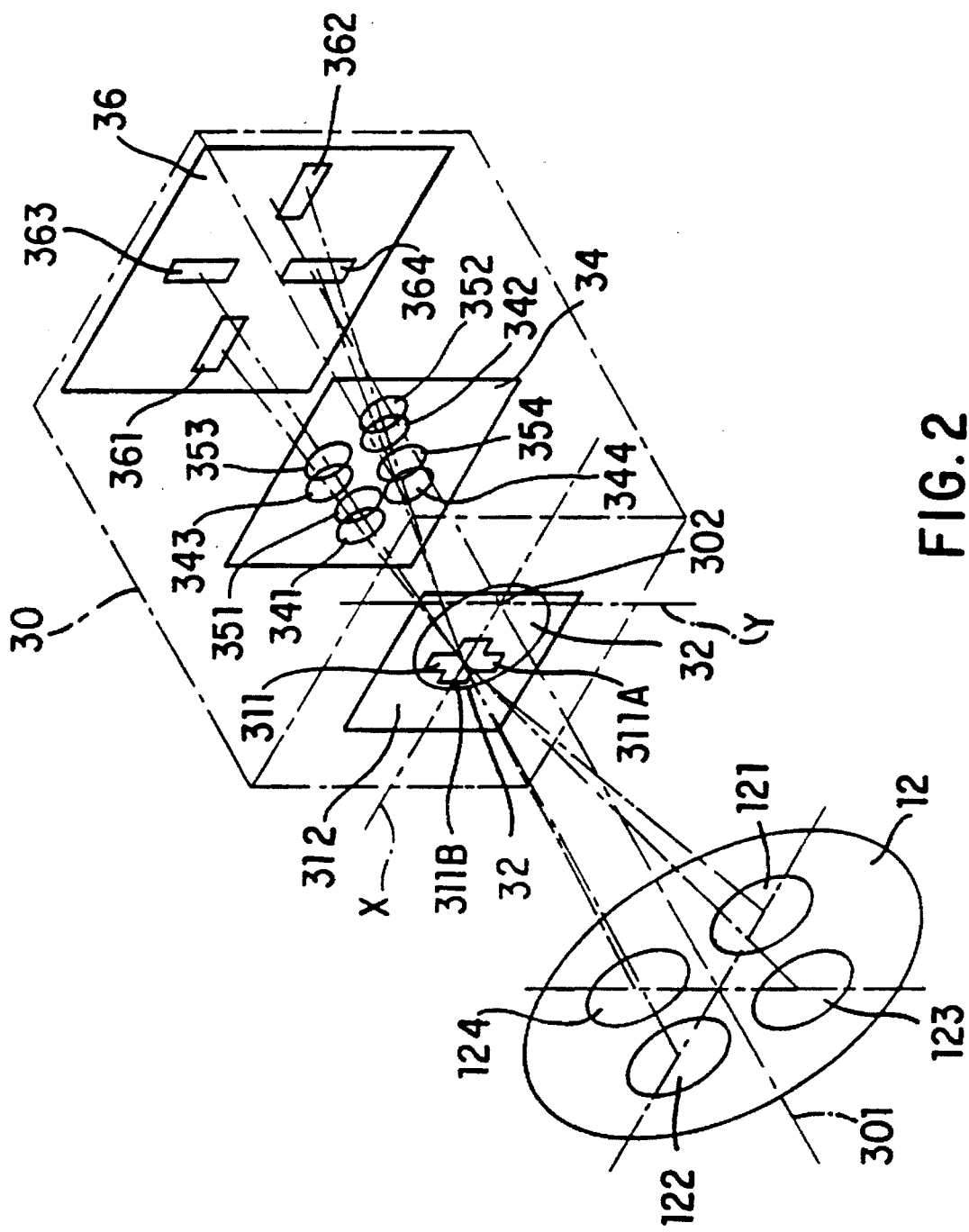
FIG. 2 is an oblique view of the focus detection optical system and image sensor according to the first embodiment of the invention.

As illustrated seen in FIG. 2, the first focus detection optical system 70 includes a detection module 30, an aperture unit 311A, a condenser lens 32, a pair of aperture stops 343,344 and a pair of recomposition lenses 353,354. The second focus detection optical system 80 comprises an aperture unit 311B, a condenser lens 32, a pair of aperture stops 341,342 and a pair of recomposition lenses 351,352. The first image sensor 71 includes a pair of light receiving units 363,364. The second image sensor 81 includes a pair of light receiving units 361,362.

The first focus detection optical system's results are computed and based on the processing of the subject image signals from the first image sensor 71, using the first algorithm processing unit 72. The second focus detection optical system's results are computed and based on the processing of the subject image signals from the second image sensor 81, using the second algorithm processing unit 82.

The operation member 13 is controlled by the photographer. An operation condition is set while operation member 13 is pressed. The non-operation condition is automatically restored when the operation member 13 is released. The operation condition of the operating member 13 is detected by the drive control unit 9. A lens data memory 15, embedded in the mounted lens barrel 2, communicates with the drive control unit 9 in the camera body 1. The lens data memory 15 transmits photo-optical system 3 lens data to the drive control unit 9.

Figure 7:
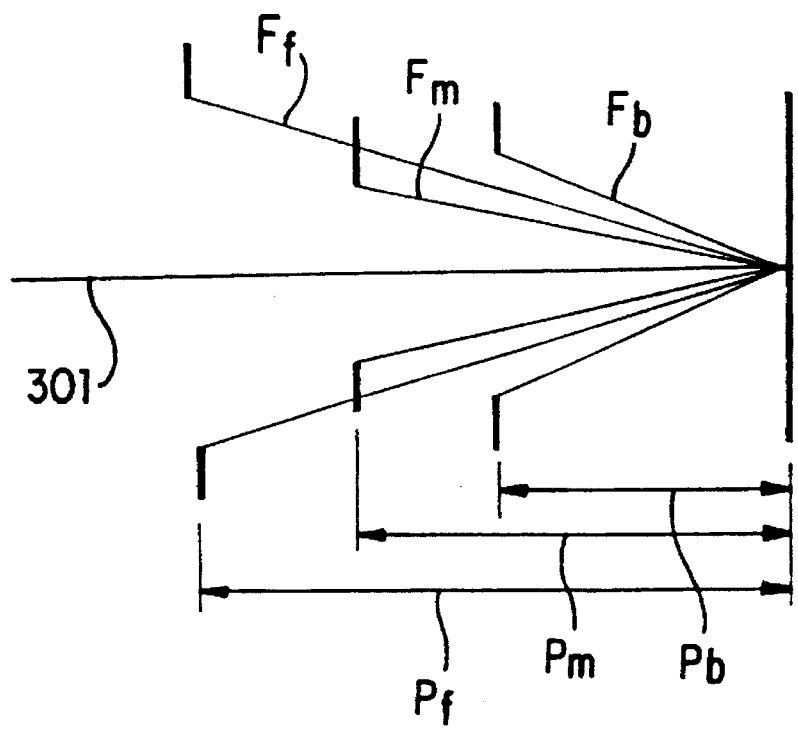
FIG. 7 is a drawing showing the lens data of a photo-optical system.

As seen in FIG. 7, the lens data includes at least an F-number Fm and distance Pm, from the exit pupil M to the anticipated focus surface in the open stop condition, an F-number Ff, and a distance Pf, from the exit pupil B to the anticipated focus surface. The exit pupil B is positioned in front of a stop. The F-number is determined by the outer diameter of the lens closest to the restriction of the shooting light rays. It is permissible to transmit the length of the diameter of the exit pupils instead of the F-number.

The drive control unit 9 detects an eclipse of focus detection light rays. The detection is based using the condition of the operation member 13 and the lens data from memory 15. Drive control unit 9 then determines whether focus detection is possible, based on the degree of eclipse. Moreover, based on the determination, the drive control unit 9 acts to give the first focus detection unit 7 priority over the detection of the second focus detection unit 8. This is because the first focus detection unit 7 has a smaller eclipse of the focus detection light rays and a higher focus detection accuracy than the second focus detection unit 8.

The drive control unit 9 also superimposes the operational condition of the first 7 and second 8 focus detection units on the finder field. Further, drive control unit 9 determines the needed focussing amount results for the photo-optical system based on the results of the first and/or the second focus detection units 7,8. Drive control unit 9 then can adjust the focus the photo optical system 3 by driving the lens drive motor 14.

The focus detection module 30 includes the focus detection optical system, the image sensor, used in the focus detection device, and a surface 12 surrounding a pupil of the photo-optical system. The focus detection module 30 is positioned off of the photo-optical system's optical axis 301. The module 30 includes a vision mask 31, having a cross-shaped aperture 311; a condenser lens 32; a stop mask 34 with two pairs of aperture stops 341,342 and 343,344; a focus detection optical system, with two pairs of recomposition lenses 351,352 and 353,354; and an image sensor 36, such as a CCD, with two pairs of light receiving units 361,362 and 363,364. Each light receiving unit 361–364 consists of a plurality of pixels. The module 30 recomposes primary images from the optical axis 301 onto the receiving units 361–364 of the image sensor 36 as two pairs of secondary images.

In FIG. 2, a surface defined by the X-axis and the Y-axis is an anticipated focus surface on the film surface. A shooting surface is established on the anticipated focus surface and is essentially equivalent to the film surface. The intersection or field center 302 of the optical axis 301 and image field coincides with the center of the image field.

Strip type first focus detection area 311A on the image field is positioned tangentially to concentric circles centered at the field center 302. The tangential direction focus detection area does not include the field center. Strip type second focus detection area 311B is positioned on the image field and is oriented radially with respect to concentric circles centered at the field center 302. It is not essential that the field center 302 coincide with the center of the image field.

Figure 4:
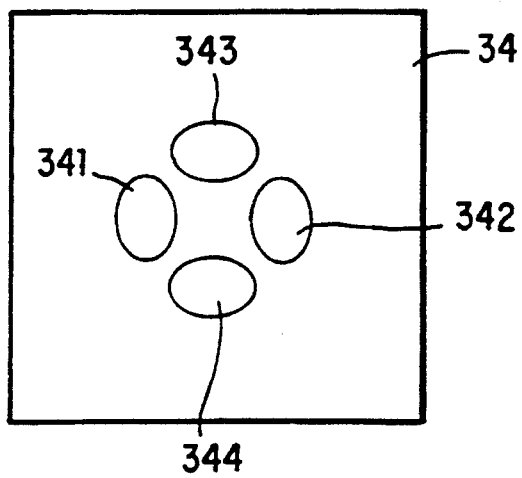
FIG. 4 is a drawing showing a stop mask according to the first embodiment of the invention.

Regions 121–124 of surface 12 permit light rays to pass to condenser 32. From condenser 32 the light rays are projected onto two pairs of aperture stops 341,342 and 343,344 of the stop mask 34. Regions 121–124 are formed in pairs 121,122 and 123,124, respectively, and are symmetrical with respect to the optical axis 301, near an exit pupil of the photo-optical system. Light rays passing through regions 121–124 form the primary image near the vision mask 31. The primary image then passes through the condenser lens 32 and the two pairs of aperture stops 341,342 and 343,344, seen in FIG. 4. The primary image is then formed, by two pair of recomposition lenses 351,352 and 353,354, as two pair of secondary images. The secondary images are formed on two pair of light receiving units 361–364 in the image sensor 36.

The light intensity distributions of the secondary images are photo-electrically converted by the light receiving units 361–364 and are output as electric subject image signals. A defocus amount, between the composition surface and the predicted focus surface, can be detected by the directional and positional relationships of the secondary image light receiving units 361–364 on the image sensor 36. The defocus amount is based on the subject image signals output from the image sensor 36.

The focus detection module 30 detects the focus adjustment condition of the photo-optical system in the first and second focus detection areas 311A,311B. In the first and the second focus detection areas 311A,311B, a focus detection light ray eclipse may occur due to the placement of the focus detection area, with respect to the field center 302 or the intersection of the optical axis 301 and the image field.

Figure 3:
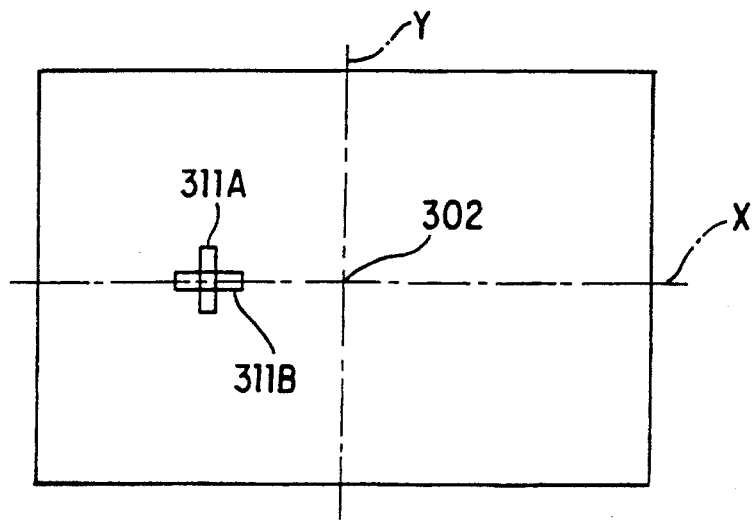
FIG. 3 is a diagram showing the location of the focus detection areas according to the first embodiment of the invention.

The overall configuration of the first and second detection areas 311A,311B and the center field 302 are related as seen in FIG. 3. An angle formed by a line connecting the mid-point of the strip type first focus detection area 311A and the intersection of the image field and the optical access of the photo-optical system and a line extending in the longitudinal direction of the first detection area is larger that an angle formed by a line connecting a mid-point of the strip type second focus detection area 311B and the intersection and a line extending in the longitudinal direction of the second focus detection area 311B, the control means can determine which area is in need of focus adjustment. Further, the mathematical processing, the priority determination and the geometrical relationship are related in a similar manner.

Alternatively, the focus adjustment condition of the photo-optical system in the first focus detection area 311A is determined by mathematically processing the output signal of the image sensor 36. The focus adjustment condition of the photo-optical system in the second focus detection area 311B is determined by mathematically processing the output signal of the image sensor 36. The mathematical processing for the output signal of the image sensor 36 in the first focus detection means 7 differs from the mathematical processing of the output signal for the image sensor in the second focus detection means 8.

Figure 5:
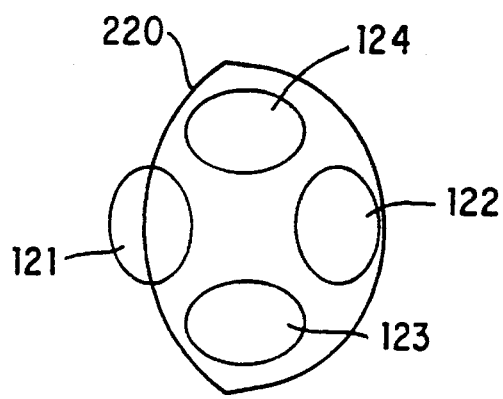
FIG. 5 is a drawing showing an eclipse in the focus detection light rays.

The relationship between the focus detection area in the image field area and an eclipse in the focus detection of light rays will now be explained in reference to FIG. 5. FIG. 5 illustrates the relationship of the pupil 220; the pupil regions 121,122, used in radial direction focus detection; and the pupil regions 123,124, used in tangential direction focus detection in optical systems having a larger F-number.

The width between pupil regions 121,122 corresponds to the strip type second focus detection area 311B from the image field. The width between pupil regions 123,124 corresponds to the strip type first focus detection area 311A. The strip type second focus detection area 311B becomes horizontally asymmetrical, illustrated radially in FIG. 5, because focus detection light rays are restricted by elements of the photo-optical systems, such as the front and rear lens. Moreover, the width between regions 121,122 will become narrower, compared to the width between pupil regions 123,124. Therefore, pupil regions 121,122 tend to produce an eclipse of the focus detection light rays more easily than the pupil regions 123,124. Thus, an eclipse of focus detection light rays occurs more easily if the focus detection area is radially directed compared to if the focus detection area is tangentially directed.

The focus determination may also use geometrical relation using the pupil areas. For example, an angle formed by a line connecting a mid-point of the first focus detection area 311A and the intersection of the image field and the optical axis 301 and a line that connects centers of the first pair of pupil areas 123,124 is compared to an angle formed by a line connecting a mid-point of the second focus detection area 311B and the intersection and a line connecting the centers of the second pair of pupil areas 121,122. Based on this comparison, the focus adjustment condition for the areas may be determined.

Figure 6A:
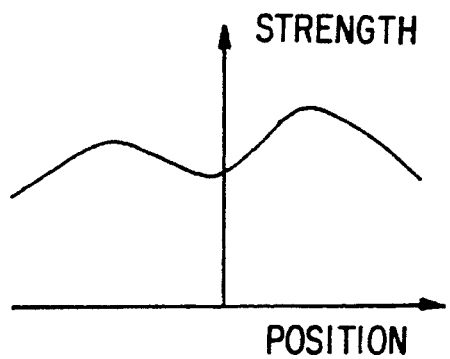
FIGS. 6(A) and 6(B) are drawings showing the light intensity distributions of a pair of subject images with an eclipse in the focus detection light rays.
Figure 6B:
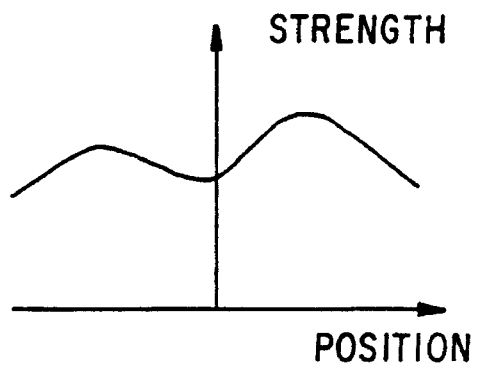
Figure 6C:
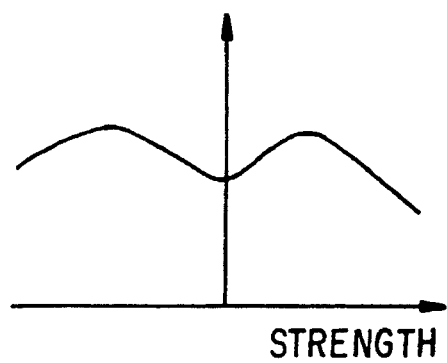
FIGS. 6(C) and 6(D) are drawings showing the light intensity distributions of a pair of subject images without an eclipse.
Figure 6D:
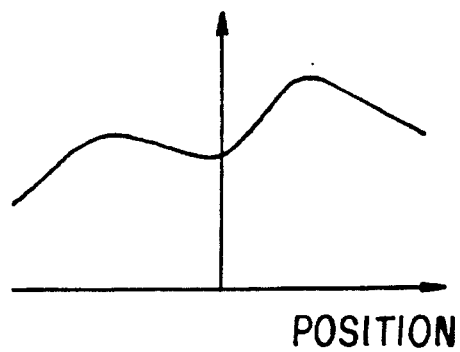

FIGS. 6(A) and 6(B) show the light intensity distribution for a pair of images formed on the image sensor 36 without an eclipse of the focus detection light rays. FIGS. 6(C) and 6(D) show the light intensity distribution for a pair of images formed on the image sensor 36 with an eclipse of the focus detection light rays.

If there is no eclipse of the focus detection light rays, the light intensity distributions of the pair of subject images are approximately equal to each other, as seen in FIGS. 6(A) and 6(B). The relationship between the relative positions of the pair of subject images is able to be accurately detected. If there is an eclipse in the focus detection light rays, the light intensity distributions of the pair of subject images are unbalanced, as shown in FIGS. 6(C) and 6(D). Therefore, a relationship between the positions of the pair of subject images is not able to be accurately detected. This causes errors in the focus detection results.

Moreover, the focus detection light rays that pass through pupil regions 121,122, also pass through the regions 121,122 partially asymmetric, with respect to the optical axis 301. This causes differences in the aberrations of these light rays. Thus, unbalanced light intensity distributions from the pair of subject images occurs, even if the eclipse is relatively minor. Further, because the light rays pass through the pupil regions 123,124 also pass partially symmetric, with respect to the optical axis 301, the aberrations of the light rays are approximately equal. Therefore, unbalanced light intensity distributions on the subject images do not result, if an eclipse does not exist.

FIG. 3 shows one embodiment of a focus detection device. A strip type first focus detection area 311A is provided on the image field. The strip type first focus detection area 311A does not contain the field center 302 or the intersection of the image field and the optical axis 301 of the photo-optical system. The strip type first focus detection area 311A is tangentially oriented with respect to concentric circles centered at the field center 302. The device includes a first focus detection means 7 for detecting the focus adjustment condition of the photo-optical system in the first focus detection area 311A. The first focus detection means 7 uses at least a pair of light rays that pass through the photo-optical system.

The device also includes the strip type second focus detection area 311B which is provided on the image field. The area 311B does not contain the field center 302 and is radially oriented with respect to a circle centered at the field center 302. The device includes a second focus detection means 8 for detecting the focus adjustment condition in the second focus detection area 311B. The second focus detection means 8 uses at least a pair of light rays that pass through the photo-optical system. Priority means causes the focus detection operation of the first focus detection means to have priority over the focus detection operation of the second focus detection means.

The focus detection device adopts the results of the focus detection by the second focus detection means 8 only when detection by the first focus detection means 7 is not possible. Further, the first and the second detection areas 311A,311B intersect perpendicularly to each other.

Focus detection determination means 7 and 8 detects an eclipse in a pair of focus detection light rays, for each of the focus detection areas. The focus detection determination means 7 and 8 bases its detection on data concerning the photo-optical system and determines whether focus detection is possible based on the degree of the eclipse. A controller causes the focus detection determination means 7 and 8 to execute the focus detection of the means that has priority to supersede the operation of the other focus detection means.

In detecting the focus adjustment condition of the photo-optical system, the focus detection operation in the first focus detection area 311A is less likely to have an eclipse of the focus detection light rays occur. A higher accuracy of focus detection is possible in the first focus detection area 311A. Therefore, the first focus detection means is given priority in the focus detection operation over the second focus detection area 311B.

The eclipse of focus detection light rays for each of the focus detection areas 311A,311B is detected from the photo-optical system's data. The determination, whether focus detection is possible or impossible, is made according to the degree of eclipse. The focus detection operation for the area in which focus detection is possible has priority over the focus detection operation in other focus detection areas.

Figure 8:
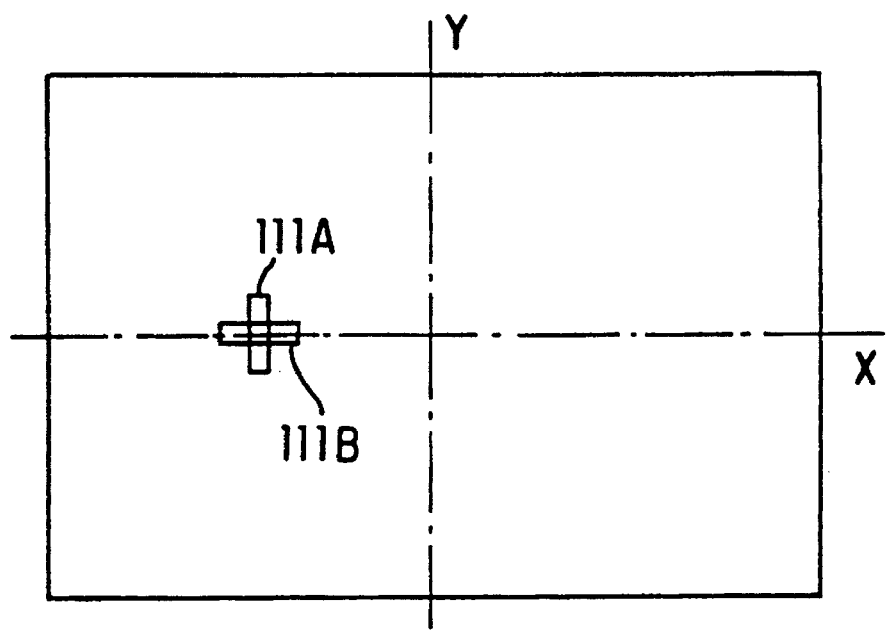
FIG. 8 is a drawing showing a display of the focus detection area within the finder field.

FIG. 8 illustrates a display by display equipment 11. An image field is formed proximate to the film surface in the finder light path. Frames 111A,111B are displayed indicating the strip type first and second focus detection areas 311A, 311B respectively. Frames 111A,111B are positioned in the field and correspond to the first and second focus detection areas 311A,311B of the image field. The frame, which corresponds to the focus detection area that has priority over the other focus detection area, is thicker compared to the other frame. For example, in FIG. 8, the frame 111A of the first focus detection area 311A has priority over the second focus detection unit 8 and is thicker, compared to the frame 111B of the second focus detection area 311B.

A controller 10 includes a first algorithm processing unit 72, the second algorithm processing unit 82, and the drive control unit. The controller 10 may take any appropriate form, such as a microcomputer. Controller 10 makes the determination of the area that has priority over the other area. The controller 10 performs the focus detection algorithm for the first and second focus detection areas 311A, 311B, by executing control programs, explained hereinafter.

Operations of the first algorithm processing unit 72 and the second algorithm processing unit 82 will now be explained. The first and second algorithm processing units 72,82 perform a filter algorithm on the subject image data, which was obtained from the first and second image sensors 71,81, respectively. First and second algorithm processing units 72,82 suppress or filter spacial frequency components greater than or equal to the Nyquist frequency wn. Here, the Nyquist frequency wn is determined by equation (1).

$$wn = 1/(2 \times P), \quad (1)$$

where P represents the pixel pitch of the second image sensors 71,81. Moreover, the subject image data obtained from the second image sensors 71,81 are in the form of discrete, AD converted digital data.

For example, let S(i) denote discrete data, where i is the arrangement of data. By using a convolution or filter algorithm on S(i), as in equation (2), frequency components greater than or equal to the Nyquist frequency wn are filtered or suppressed.

$$\begin{aligned} S'(i) &= S(i) @ W(i) \quad (2) \\ &= S(i-2) + 3S(i-1) + 4S(i) + \\ &\quad 3S(i+1) + S(i+2), \end{aligned}$$

where @ represents the convolution algorithm. The weights W(i) are W(−2)=1, W(−1)=3, W(0)=4, W(1)=3, W(2)=1, and other W(i)=0. S'(i) represents the data after filter processing.

Figure 9:
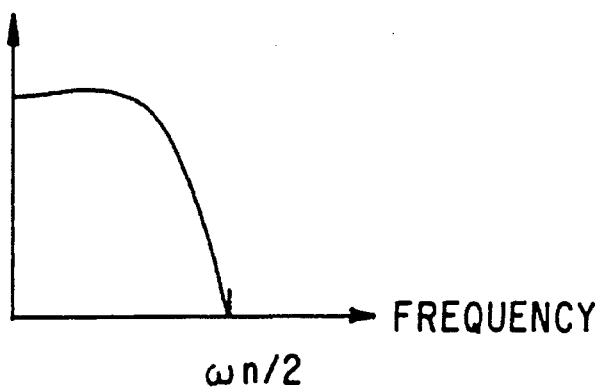
FIG. 9 is a drawing showing the frequency characteristics of high frequency filter processing on the subject image data.

The frequency characteristics of filter processing by equation (2) are now described with respect to FIG. 9. Filter processing by equation (2) filters or suppresses high frequency components. The process is a high frequency filter processing, in order to differentiate filter processing by equation (3), explained later. The first and second algorithm processing units 72,82 execute algorithm processing using equation (2) on the subject image data, where the subject image data was obtained from the first and second image sensors 71,81.

When an imbalance the subject image data occurs, due to an eclipse in the focus detection light rays, as in FIGS. 6(C) and 6(D), filter processing by equation (3) is conducted on the subject image data. The processing occurs after high frequency filter processing by equation (2), to eliminate or to suppress the high frequency component. This sequence is preferred because an imbalance due to an eclipse is caused by a low frequency component.

For example, let S'(i) denote discrete data after high frequency filter processing by equation (2), where i represents the arrangement of data. By executing a convolution or filter algorithm on S'(i) as in equation (3), the low frequency component is filtered or suppressed from the data S'(i).

$$\begin{aligned} T(i) &= S'(i) @ W(i) \quad (3) \\ &= -S'(i-2) + 2S'(i) - S'(i+2) \end{aligned}$$

where @ represents the convolution algorithm. The weights W(i) are W(−2)=−1, W(−1)=0, W(0)=2, W(1)=0, W(2)=−1, and other W(i)=0. T(i) represents the data after filter processing.

Figure 10:
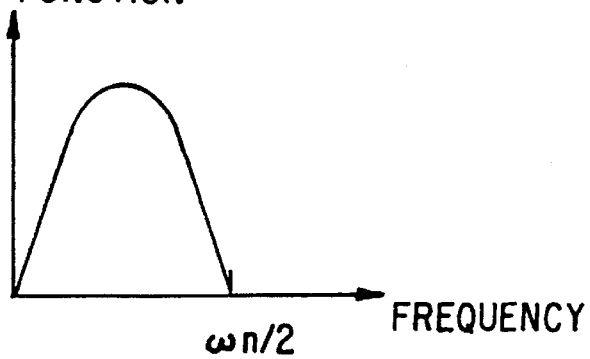
FIG. 10 is a drawing showing the frequency characteristics of low frequency filter processing on the subject image data.
Figure 11:
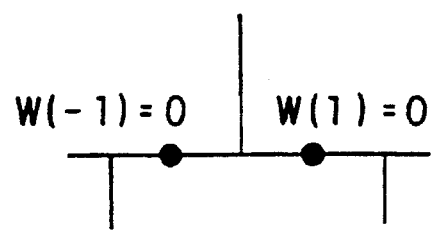
FIG. 11 is a drawing illustrating low frequency filter processing.

The characteristics of filter processing by equation (3) are shown in FIG. 10. Filter processing by equation (3) eliminates or suppresses the low frequency component. Therefore, the process is called low frequency filter processing, differentiating it from the filter processing of equation (2). Processing by equation (3) eliminates or suppresses the high frequency component, in addition to the low frequency component.

The second algorithm processing unit 82 always executes low frequency filter processing, using equation (3), on the subject data obtained from the second image sensor 81, when an eclipse may be formed. The first algorithm processing unit 81 only executes low frequency filter processing by equation (3) on the subject data obtained from the first image sensor 71, if an eclipse occurs due to the drive control unit 9.

The computation of the correlation or image shift detection algorithm will now be described. A(i) and B(i) represent a pair of subject images after filter processing, where i=1–20. First, a correlation amount C(L) is obtained, using the correlation algorithm described in equation (4).

$$C(L) = \Sigma |A(i+L) - B(i)|, \quad (4)$$

where Σ denotes the total sum over i=j to i=j+7 and L is an integer representing the relative shift. L is expressed in units equal the pitch of the light receiving elements in the first and the second image sensors 71,81. L has a range in equation (4) from −12 to +12. Moreover, j corresponds to the shift amount L, for example, j=7 if L=0.

Figure 12:
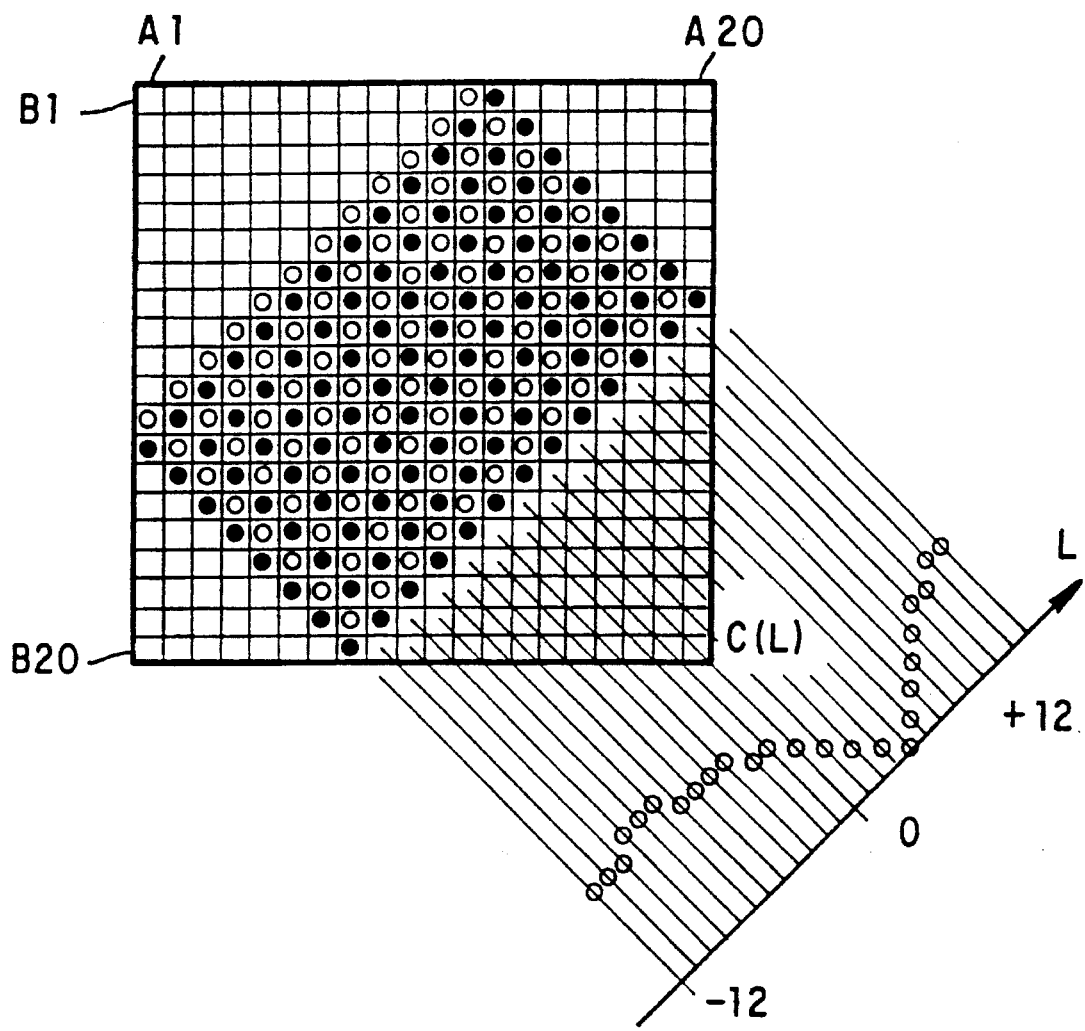
FIG. 12 is a drawing illustrating correlation algorithm processing.

A graph for equation (4) is shown in FIG. 12. The horizontal axis represents the subject image data A(i) and the vertical axis represents the subject data B(i). The positions of the ordered pairs on which subtraction has been performed are denoted by white circles O and filled-in circles ●, respectively. The total number of summations according to Equation (4) is 8. Addition is performed separately for all the sets of circles aligned obliquely towards the lower right corner of the graph of FIG. 12. A correlation value C(L) is represented by a white circle, where the horizontal axis denotes shift amount L.

Figure 13:
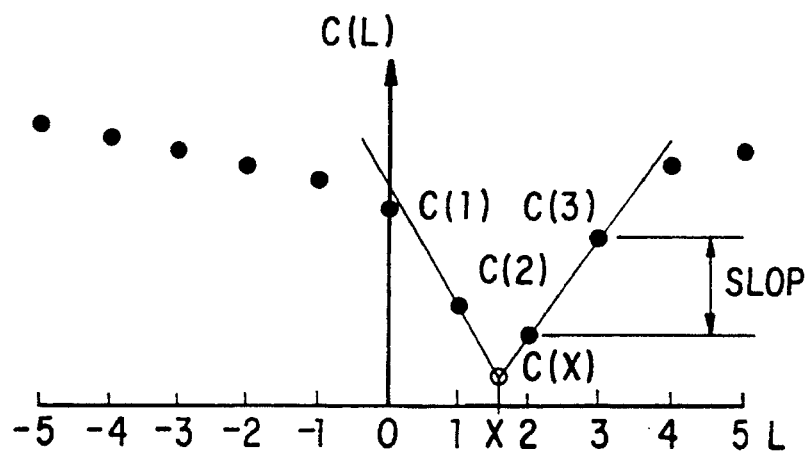
FIG. 13 is a drawing further illustrating correlation algorithm processing.

FIG. 13 illustrates the procedure to compute the defocus amount DEF from the correlation amount C(L). The result of the algorithm in equation (4) shows that the correlation amount C(L) becomes minimum with a shift amount of L=kj (kj=2 in FIG. 13), having a high subject image data correlation. Next, a shift amount x, which gives the minimum C(L) or min=C(x) for a continuous correlation amount, is obtained using the three point enclosure method expressed in equations (5)–(8).

$$x = kj + D/SLOP \qquad (5)$$

$$c(x) = c(kj) - |D| \qquad (6)$$

$$D = \{c(kj-1) - c(kj+1)\}/2 \qquad (7)$$

$$SLOP = MAX\{c(kj+1) - c(kj), c(kj-1) - c(kj)\} \qquad (8)$$

Moreover, using shift amount x, obtained in equation (5), a defocus amount DEF can be obtained from equation (9).

$$DEF = KX \cdot P \cdot x, \qquad (9)$$

where P is the pitch of the pixel arrangement, including light receiving units of the first and the second image sensors 71 and 81, and KX is a conversion coefficient determined by the structure of the focus detection optical system.

If the following focus detection algorithm results are obtained, focus detection is determined to be impossible. Here, the determination of focus detection possibility or impossibility is based only on the results of the focus detection algorithm. It is different from the determination of focus detection possibility or impossibility based on an eclipse in the focus detection light rays, as described above.

Figure 14:
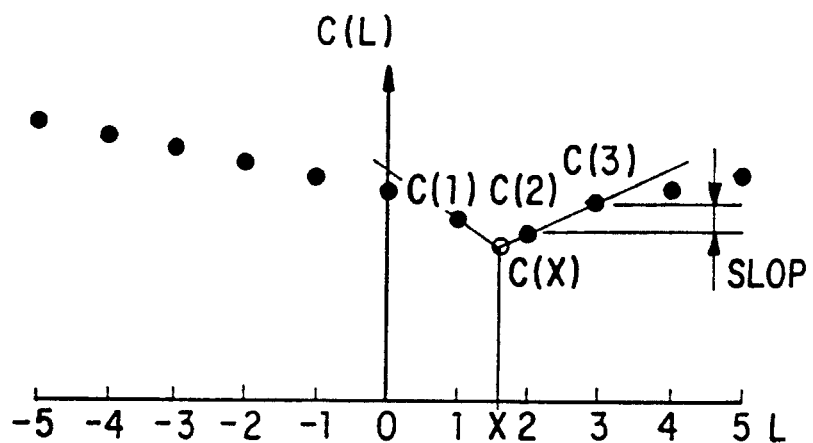
FIG. 14 is another drawing further illustrating correlation algorithm processing.
Figure 15:
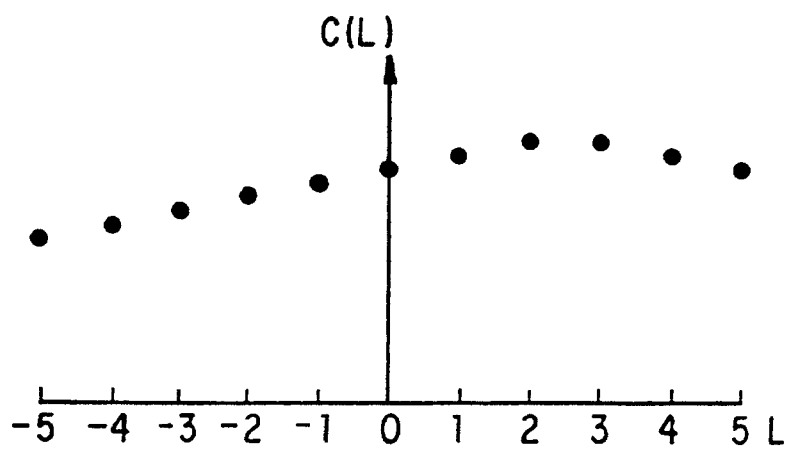
FIG. 15 is yet another drawing illustrating correlation algorithm processing.

As in FIG. 14, the minimum value C(X) of the enclosed correlation amount becomes large if the level of correlation for the subject image data is low. Therefore, if the minimum value C(X) is greater than or equal to a specified value, confidence level is low and focus detection is determined to be impossible. If the value, after excluding C(X) using SLOP, is greater than or equal to the specified value, focus detection is determined to be impossible because a confidence level is low. Further, if SLOP is smaller than or equal to the specified value, the subject has a low contrast and focus detection is determined to be impossible, because the confidence level of the computed defocus amount DEF is low. Moreover, if correlation among the subject data is low and if there is no drop of the correlation amount C(L) within the shift range, the minimum value C(X) cannot be computed. Therefore, focus detection is also determined to be impossible.

The first and second algorithm processing units 72,82 perform the focus detection algorithm process for the subject image data obtained from the first and second image sensors 71 and 81, respectively. FIGS. 16–20 illustrate flow charts for the control program of the controller or microcomputer 10. The operation of the first algorithm processing unit 72, the second algorithm processing unit 82, and the drive control unit 9 will now be explained in reference to these flow charts.

Figure 16:
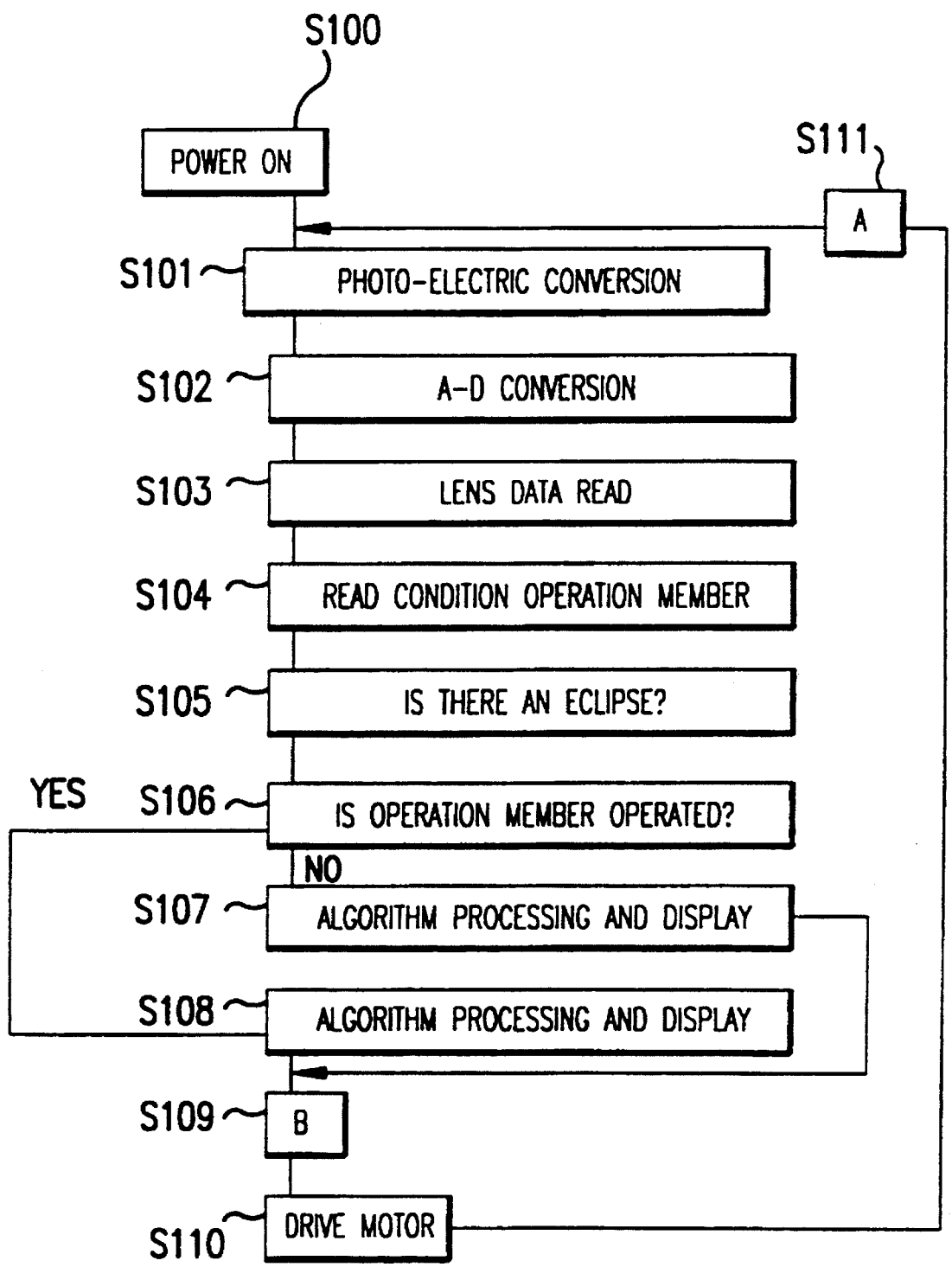
FIG. 16 is a flow chart showing the main program of the controller used in an embodiment of the invention.

FIG. 16 describes the main control program for the controller or microcomputer 10. After activation of a power source for the camera at step S100, the controller 10 executes the control program. At step S101, controller 10 causes the first and second image sensors 71,81 to photoelectrically convert the subject image. At step S102, controller 10 executes AD conversion of the signals output from the image sensors 71,81. After the controller 10 suppresses the high frequency component, which would be harmful to the focus detection using the high frequency filter process of equation (2), the controller 10 stores the results as subject image data in a memory.

At step S103, the controller 10 accesses the lens data memory 15, which is embedded in the lens barrel 2. Controller 10 receives lens data such as Ff, Fm, Fb, Pf, Pm, and Pb, as shown in FIG. 7. At step S104, the operational condition of the operation member 13 is read or determined.

At step S105, the possibility or impossibility of focus detection, based on the level of an eclipse in the focus detection light rays, is determined using the data received from the lens data memory 15. As described in FIG. 5, the relationship of the pupil 220, looking from the first focus detection area 311A to pupil regions 123,124, which correspond to the first focus detection unit 7, is checked. If there is not an eclipse in the pupil regions or in the focus detection light rays, the controller 10 declares "no eclipse." If an eclipse in the focus detection light rays exists, but the eclipse level is low, controller 10 declares "focus detection possible." If the eclipse level is large, controller 10 declares "focus detection impossible."

Similarly, the relationship of the pupil 220, looking from the second focus detection area 311B to pupil regions 121,122, which correspond to the second focus detection unit 8, is checked. If there is no eclipse in the pupil regions or in the focus detection light rays, or if an eclipse in the focus detection light rays exists but the level is low, the controller 10 declares "focus detection possible". However, if the eclipse level is large, it declares "focus detection impossible." No eclipse and small eclipse conditions are combined in the second focus detection unit 8, because the focus detection area of the second focus detection unit 8 is radially directed, which causes a drop in the focus detection accuracy due to aberrations of the photo-optical system, even without eclipse.

At step S106 the program splits according to the operation condition of operation member 13. If the operation member 13 is in a non-operation condition or the normal condition, the program proceeds to step S107. If the operation member 13 is in the operation condition, the program moves to step S108.

In the normal condition, focus detection algorithm processing and display processing are executed at step S107, based on the eclipse level in the focus detection light rays of the first and the second focus detection units 7,8. These results are summarized in FIGS. 21 and 22 and Tables 1 and 2 below.

If an eclipse condition in both the first and the second focus detection units is not determined, the first focus detection by the first focus detection unit is set to have priority over the other unit or be in a priority mode.

If the operation member 13 is in the operation condition, focus detection algorithm processing and display processing are executed step S108. Step S108 uses determination results based on the eclipse level of the focus detection light rays of the first and the second focus detection units 7,8. These results are summarized in FIGS. 23 and 24 and Tables 3 and 4 below.

Figure 23:
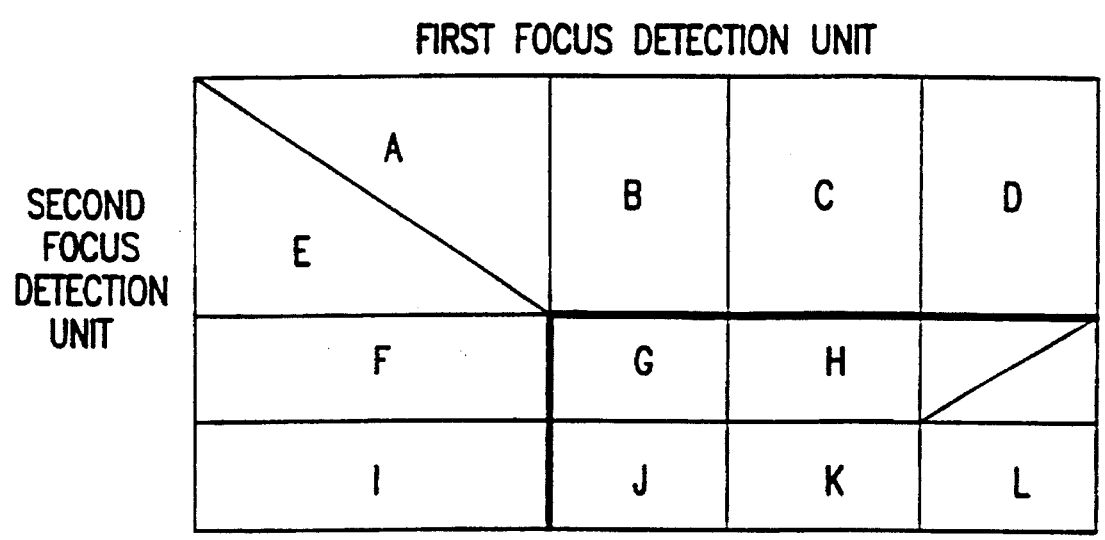
Figure 24:
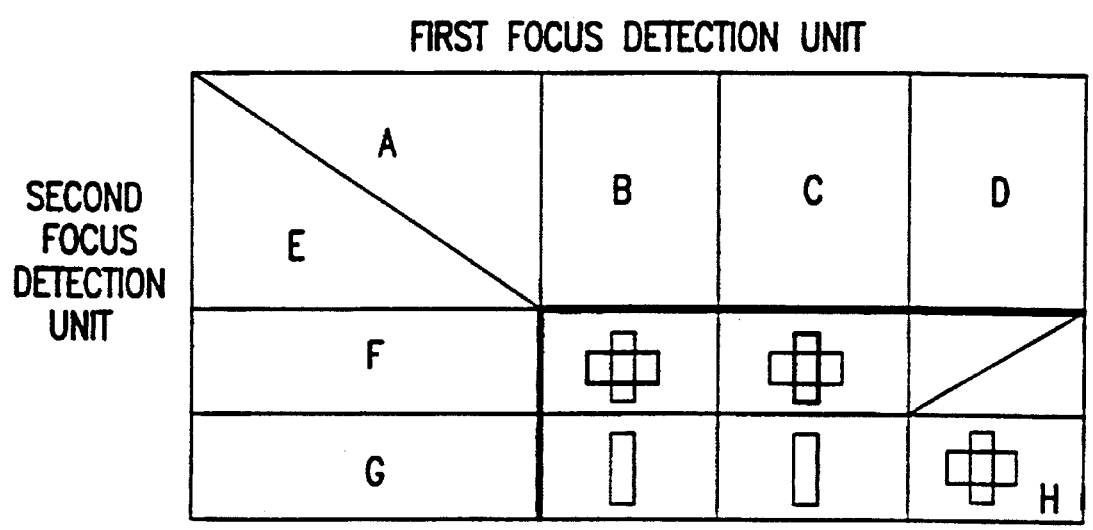

In FIG. 23 and Tables 3, if an eclipse condition of both first and the second focus detection units is not determined, the first focus detection by first focus detection unit 7 is set to the priority mode.

The program moves to step S110 via step S109, point B, and determines the required lens driving amount. The lens driving amount is based on the focus detection results obtained at step S107 or step S108, after focus detection algorithm and display processing. The program then acts to drive the motor 14 in the determined amount. The program returns to step S101 via step S111, point A and repeats the above operation.

Figure 21:
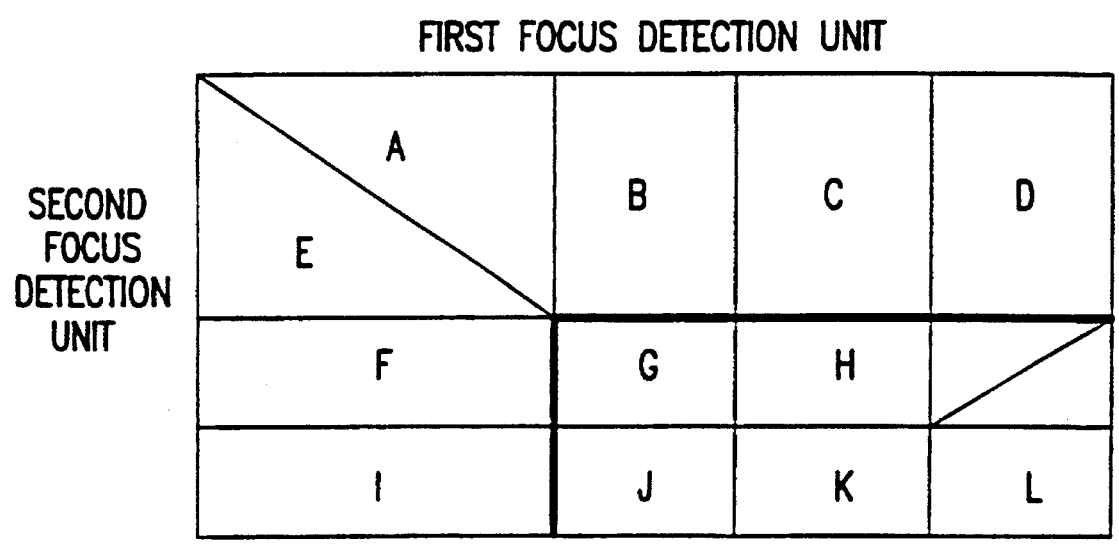
FIGS. 21–24 represent focus detection results and display results for conditions of the invention.
Figure 22:
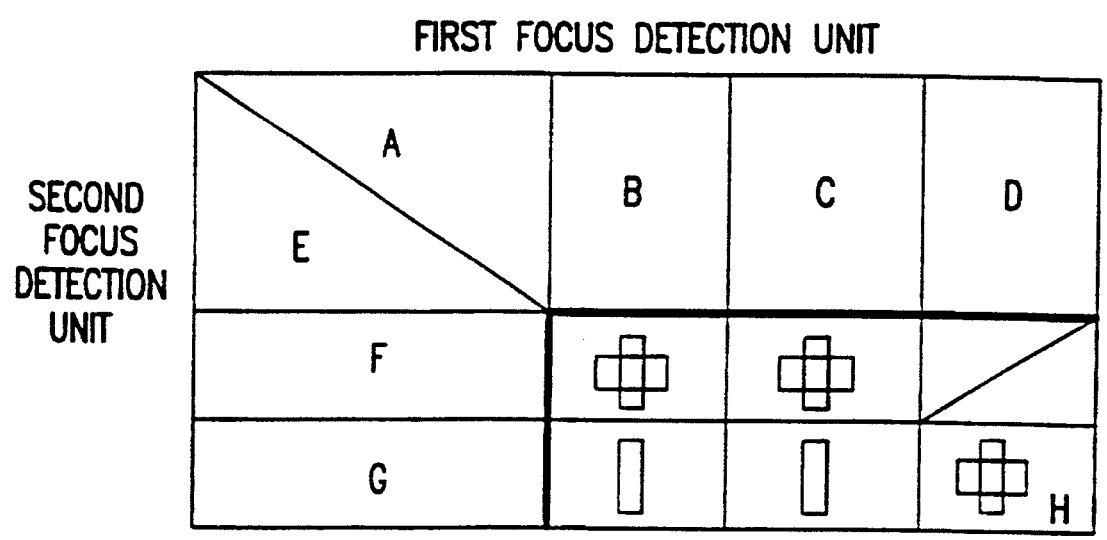

The results of the process summarized in FIG. 21 and Table 1 will now be explained. If the first focus detection unit 7 has no eclipse and the second focus detection unit 8 is able to conduct focus detection, or if the first focus detection unit 7 has some eclipse, but is still able to conduct focus detection, and the second focus detection unit 8 is also able to conduct focus detection, the program sets the first focus detection unit 7 to a priority mode. Then, the program executes the first focus detection priority mode program, illustrated in FIG. 17.

If the first focus detection unit 7 has no eclipse and the second focus detection unit 8 is not able to conduct focus detection, or if the first focus detection unit 7 has some eclipse, but is still able to conduct focus detection, and the second focus detection unit 8 is not able to conduct focus detection, the program is set to a first focus detection unit only mode. Then, the program then executes the first focus detection only mode program, illustrated in FIG. 19.

Figure 20:
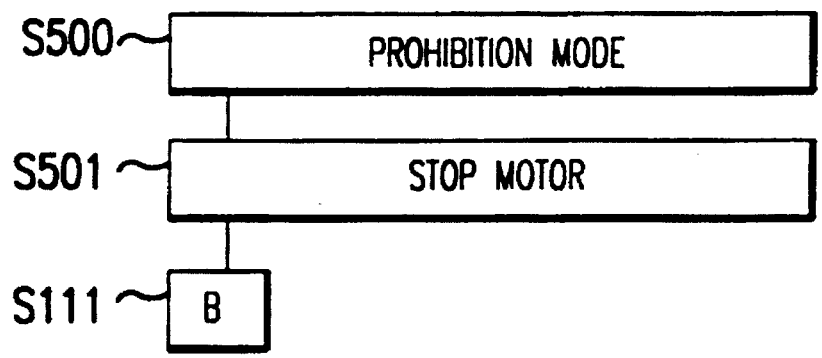
FIG. 20 is a flow chart showing the prohibition mode program according to the first embodiment.

If neither the first nor second focus detection units 7 and 8 is able to conduct focus detection, the program is set to a prohibition mode, illustrated in FIG. 20.

Additionally, if a lens barrel 2, without a lens data memory 15 embedded therein, is mounted on a camera, the determination of whether focus detection is possible cannot be carried out. This is due to the focus detection being based on the eclipse level in the focus detection light rays of the first and the second focus detection units 7,8. Therefore, the program is set to a first focus detection unit priority mode and executes the program. It is impossible for the first focus detection unit 7 not to be able to conduct focus detection and for the second focus detection unit 8 to be able to conduct focus detection because of the manner in which the pupil region has been established.

TABLE 1

OPERATION WHEN THE OPERATION MEMBER IS NOT OPERATED

A. Eclipse Condition Of The First Focus Detection Unit
B. No Eclipse
C. Eclipse Exists But Focus Detection Possible
D. Focus Detection Impossible
E. Eclipse Condition Of The Second Focus Detection Unit
F. Focus Detection Possible
G. First Focus Detection Unit In A Priority Mode
H. First Focus Detection Unit In A Priority Mode
I. Focus Detection Impossible
J. First Focus Detection Unit Only Mode
K. First Focus Detection Unit Only Mode
L. Prohibition Mode The display processing results summarized in FIG. 22 and Table 2 will now be explained. If the first focus detection unit 7 has no eclipse and the second focus detection unit 8 is able to execute focus detection, or if the first focus detection unit 7 has some eclipse, but is still able to conduct focus detection, and the second focus detection unit 8 is also able to execute focus detection, frame 111A, corresponding to the first focus detection area 311A, will be displayed as a thickened frame. This indicates that the focus detection operation of the first focus detection unit 7 is set to have priority. Frame 111B, corresponding to the second focus detection area 311B, will be displayed as thinner frame, indicating that the results of the second focus detection unit 8 are adopted when, based on the results from the first focus detection unit 7, the program declares focus detection impossible.

If the first focus detection unit 7 has no eclipse and the second focus detection unit 8 is not able to execute focus detection, frame 111A, which corresponds to the first focus detection area 311A, will also be displayed as a thickened frame. This indicates that there is no eclipse in the first focus detection unit 7. Frame 111B, corresponding to the second focus detection area 311B, will not be displayed indicating that the results of the second focus detection unit 8 cannot be adopted, even when, based on the results of the first focus detection unit 7, the program declares focus detection to be impossible.

If the first focus detection unit 7 has some eclipse, but is still able to conduct focus detection, and the second focus detection unit 8 is not able to conduct focus detection, frame 111A, corresponding to the first focus detection area 311A, will be displayed as a thin frame. This indicates that some eclipse exists in the first focus detection unit 7. Frame 111B, corresponding to the second focus detection area 311B, will not be displayed indicating that results of the second focus detection unit 8 are not adopted, even when, based on the results of the first focus detection unit 7, the program declares focus detection to be impossible. If both the first and the second focus detection units 7 and 8 are not able to conduct focus detection, both the frames 111A and 111B flash, indicating that focus detection is impossible due to eclipse.

The display results of the process summarized FIG. 23 and Table 3 will now be explained. If the first focus detection unit 7 has no eclipse and the second focus detection unit 8 is able to execute focus detection, or if the first focus detection unit 7 has some eclipse, but is still able to execute focus detection, and the second focus detection unit 8 is also able to execute focus detection, the program is set to have the second focus detection unit to be in the priority mode. The program then executes the second focus detection priority mode program, illustrated in FIG. 18.

If the first focus detection unit 7 has no eclipse and the second focus detection unit 8 is not able to execute focus detection, or if the first focus detection unit 7 has some eclipse, but is still able to execute focus detection, and the second focus detection unit S is not able to execute focus detection, the program is set to a first focus detection unit only mode. The program then executes the first focus detection only mode program, illustrated in FIG. 19.

If neither the first focus detection unit 7 nor the second focus detection unit 8 is able to execute focus detection, the program is set to a prohibition mode and executes the prohibition program, illustrated in FIG. 20.

TABLE 3

DISPLAY WHEN THE OPERATION MEMBER IS OPERATED

A. Eclipse Condition Of The First Focus Detection Unit
B. No Eclipse
C. Eclipse Exists But Focus Detection Possible D. Focus Detection Impossible
E. Eclipse Condition Of The Second Focus Detection Unit
F. Focus Detection Possible
G. Focus Detection Impossible
H. Flashing If a lens barrel 2 without a lens data memory 15 is mounted on a camera, the determination whether focus detection is possible, based on the eclipse level in the focus detection light rays of the first and second focus detection units 7 and 8, cannot be carried out. Therefore, the program is set to a second focus detection unit priority mode. Furthermore, it is impossible for the first focus detection unit 7 not to be able to conduct focus detection and the second focus detection unit 8 to be able to conduct focus detection because of the manner in which the pupil region has been established.

TABLE 4

OPERATION WHEN THE OPERATION MEMBER IS OPERATED

A. Eclipse Condition Of The First Focus Detection Unit
B. No Eclipse
C. Eclipse Exists But Focus Detection Possible
D. Focus Detection Impossible
E. Eclipse Condition Of The Second Focus Detection Unit
F. Focus Detection Possible
G. Switch The Second Focus Detection Unit To Be In A Priority Mode
H. Switch The Second Focus Detection Unit To Be In A Priority Mode
I. Focus Detection Impossible
J. First Focus Detection Unit Only Mode
K. First Focus Detection Unit Only Mode
L. Prohibition Mode Next, the display results summarized in FIG. 24 and Table 4 will be explained. If the first focus detection unit 7 has no eclipse and the second focus detection unit 8 is able to execute focus detection, or if the first focus detection unit 7 has some eclipse, but is still able to conduct focus detection, and the second focus detection unit 8 is also able to execute focus detection, frame 111B, which corresponds to the second focus detection area 311B, will be displayed as a thickened frame. This indicates that the focus detection operation of the second focus detection unit 8 is set to have priority. The frame 111A, corresponding to the first focus detection area 311A, will be displayed as a thinner frame, indicating that results of the first focus detection unit 7 are adopted when, based on the results of the second focus detection unit 8, the program declares focus detection to be impossible.

If the first focus detection unit 7 has no eclipse and the second focus detection unit 8 is not able to conduct focus detection, frame 111A, which corresponds to the first focus detection area 311A, will be displayed as a thickened frame. This indicates that there is no eclipse in the first focus detection unit 7. Frame 111B, corresponding to the second focus detection area 311B, will not be displayed, indicating that results of the second focus detection unit 8 are not adopted, even when the program declares focus detection to be impossible, based on the results of the first focus detection unit 7.

If the first focus detection unit 7 has some eclipse, but is still able to conduct focus detection, and the second focus detection unit 8 is not able to conduct focus detection, frame 111A, which corresponds to the first focus detection area 311A, will be displayed as a thinned frame. This indicates that there is some eclipse in the first focus detection unit 7. Frame 111B, corresponding to the second focus detection area 311B, will not be displayed, indicating that results of the second focus detection unit 8 are not adopted, even when, based on the results of the first focus detection unit 7, the program declares focus detection to be impossible. If both the first and the second focus detection units 7 and 8 cannot conduct a focus detection, both frames 111A and 111B flash, indicating that focus detection is impossible due to eclipse.

The determination of whether focus detection is possible, based on the eclipse level in the focus detection light rays of the first and the second focus detection units 7 and 8 cannot be carried out if a lens barrel 2, without a lens data memory 15, is mounted on a camera. In this situation, frame 111B, which corresponds to the second focus detection area 311B, will be displayed as a thickened frame, indicating that focus detection operation of the second focus detection unit 8 is set to a priority mode. Frame 111A, corresponding to the first focus detection area 311A, will be displayed as a thinner frame, indicating that results of the first focus detection unit 7 are adopted when, based on the results of the second focus detection unit 8, the program declares focus detection to be impossible. Furthermore, it is impossible for the first focus detection unit 7 not to be able to conduct focus detection and the second focus detection unit 8 to be able to conduct focus detection, because of the manner in which the pupil region has been established.

Figure 17:
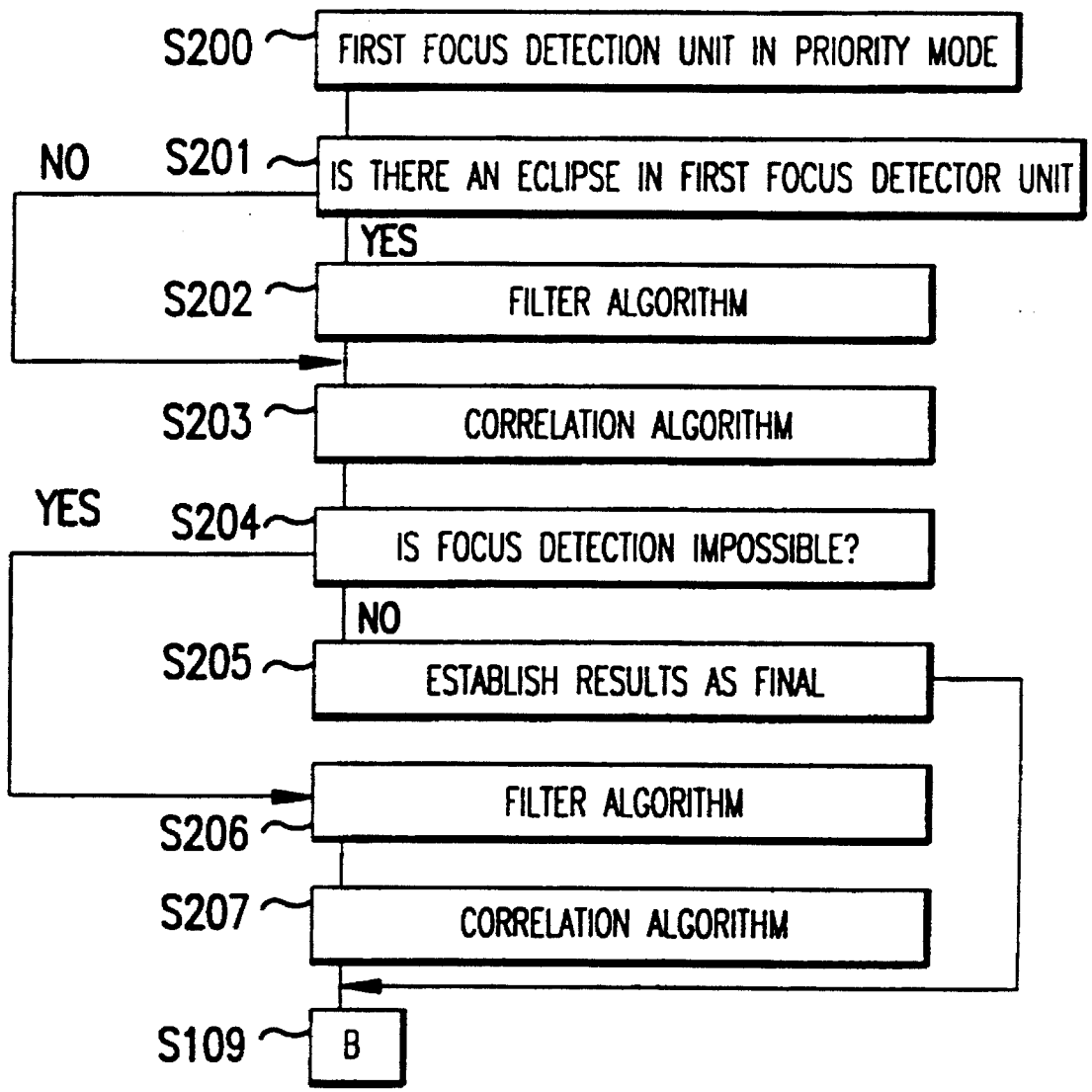
FIG. 17 is a flow chart showing the first focus detection unit priority mode program according to the first embodiment.

FIG. 17 illustrates the first focus detection unit priority mode program. Execution of the first focus detection unit priority mode program begins at step S200. The program advances to step S201 and the first focus detection unit priority mode is selected, based on whether focus detection is due to the eclipse level in the focus detection light rays of the first and the second focus detection units 7,8 during the non-operation condition of the operation member 13. At step S201, the occurrence of an eclipse is determined. If an eclipse is found, then the program moves to step S202. Otherwise, the program skips step S202. If an eclipse occurs in the first focus detection unit 7, low frequency filter processing is performed on the subject image data from the first image sensor 71. The filter processing uses equation (3) in step S202. The low frequency components are filtered and suppressed thereby reducing the effects of the eclipse. The program moves to step S203, where the correlation algorithm is applied to the subject image data, with or without low frequency filter processing. This correlation algorithm produces the results for the first focus detection unit 7.

At step S204, a determination whether the first focus detection unit 7 is able to conduct focus detection is made. If the first focus detection unit 7 is unable to conduct focus detection, the program moves to step S206. If the first focus detection unit 7 can conduct focus detection, the program moves to S205 and the focus detection results of the first focus detection unit 7 are set as the final focus detection results at step S205. The program then advances to step S109, point B in the main program, illustrated in FIG. 16.

However, if the first focus detection unit 7 is unable to conduct focus detection, a low frequency filter processing is performed on the subject image data in the second image sensor 81. The low frequency filter processing uses equation (3) at step S206 and suppresses the low frequency component, thereby reducing the eclipse's effects. At step S207, the correlation algorithm is conducted on the subject image data having already been subjected to a low frequency filter processing and the results of the second focus detection unit 8 are set as the final focus detection results. The program then advances to step S109, point B in the main program, illustrated in FIG. 16.

Figure 18:
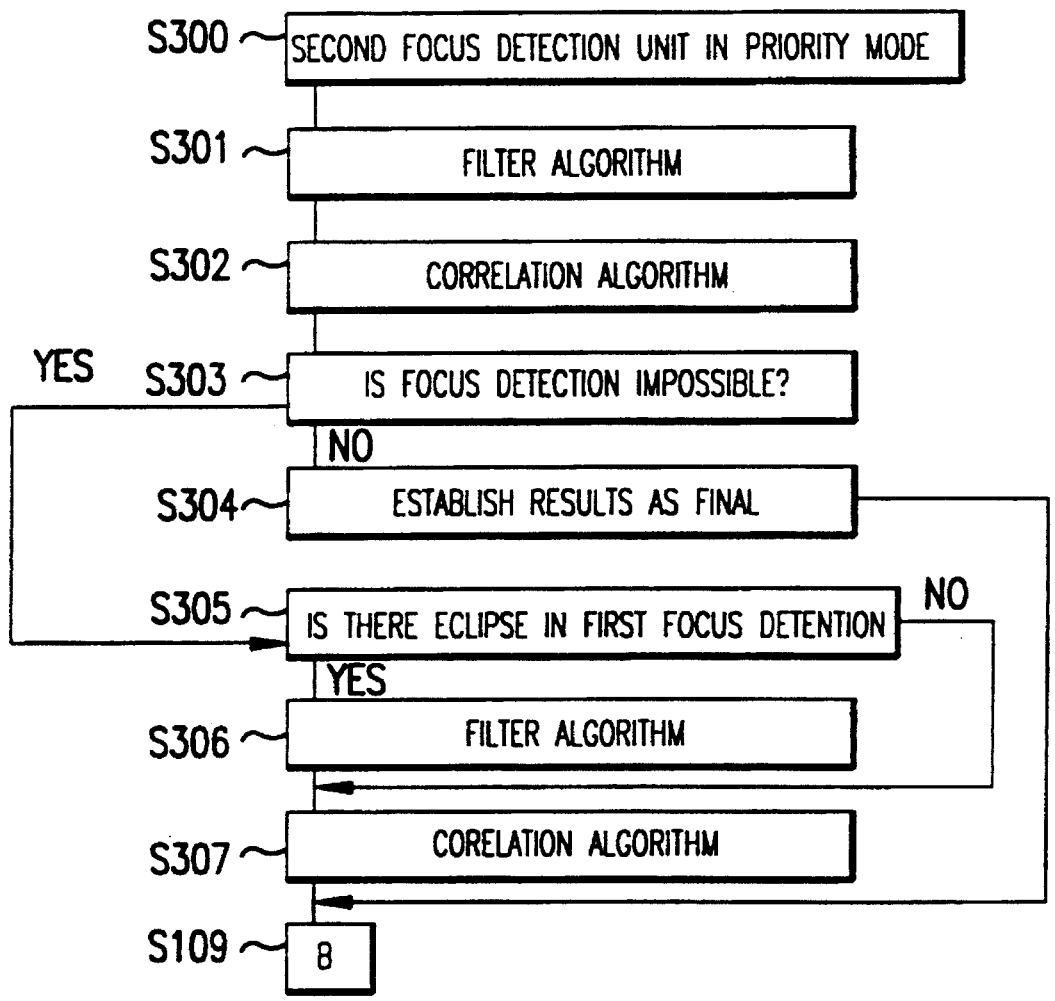
FIG. 18 is a flow chart showing the second focus detection unit priority mode program according to the first embodiment.

FIG. 18 illustrates the first focus detection unit priority mode program. Execution of the first focus detection unit priority mode program begins at step S300. The program advances to step S301 if the second focus detection unit priority mode is selected. At step 301, low frequency filter processing performed on the data of the second image sensor 81, using equation (3). The low frequency component is suppressed to reduce effects of the eclipse.

At step S302, the correlation algorithm is applied to the subject image data having the low frequency filter processing. At step S303, a determination is made whether the second focus detection unit 8 is able to conduct focus detection based on the focus detection algorithm results.

If the second focus detection unit 8 can conduct focus detection, the program moves to step S304 and sets the focus detection results of the second focus detection unit 8 as the final focus detection results. The program then advances to step S109, point B in the main program, illustrated in FIG. 16. However, if the second focus detection unit 8 is not able to conduct focus detection, the program determines if an eclipse in the focus detection light rays of the first focus detection unit 7 has occurred at step S305. If an eclipse is found, the program moves to step S306, otherwise the program skips S306.

If an eclipse occurs in the first focus detection unit 7, a low frequency filter processing is performed at step S306, on the subject image data of the first image sensor 71, using equation (3). The low frequency component is suppressed, thereby reducing the effects of the eclipse. At step S307, the correlation algorithm is then applied, based on the subject image data with or without a low frequency filter processing. The focus detection results obtained are then set as the final focus detection results. The program advances to step S109, point B in the main program, illustrated in FIG. 16.

Figure 19:
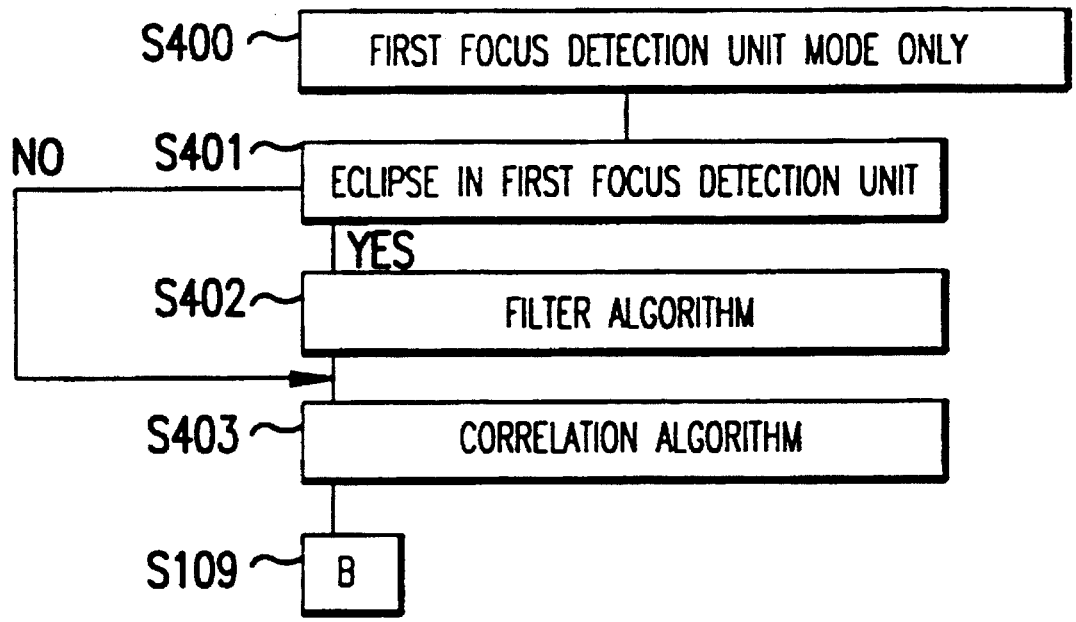
FIG. 19 is a flow chart showing the first focus detection unit only mode program according to the first embodiment.

FIG. 19 illustrates the first focus detection unit only mode program. Execution of this program begins at step S400 when the first focus detection only mode is selected. As discussed above, the first focus detection only mode selection is based on the determination of whether focus detection is possible, due to the eclipse level in the focus detection light rays of the first and the second focus detection units 7,8, and the operational condition of the operation member 13. At step S401, the occurrence of an eclipse in the focus detection light rays of the first focus detection unit 7 is determined. If an eclipse is found, the program moves to step S402, otherwise it skips step S402. If an eclipse occurs in the first focus detection unit 7, a low frequency filter processing is performed on the subject image data of the first image sensor 71, at step S402, using equation (3). The low frequency component is suppressed, thereby reducing the effects of the eclipse.

At step S403, the correlation algorithm is applied to the subject image data with or without low frequency filter processing and establishes the focus detection results to be the final focus detection results. The program advances to step S109, point B in the main program, illustrated in FIG. 16.

FIG. 20 describes the prohibition mode program. Execution of this program begins at step S500, based on the results of a determination whether focus detection is possible, due to the eclipse level in the focus detection light rays of the first and the second focus detection units 7,8 and the operational condition of the operation member 13. At step S501, the program simply stops the lens driving motor 14 and then moves to step S111, point A in the main program, illustrated in FIG. 16. There is no focus detection operation in this program.

In the embodiment explained above, the display in the focus detection area display can change, depending on the results of the determination whether focus detection is possible. Therefore, it is easy to determine a focus detection area where an eclipse occurs. If an eclipse is found in the focus detection area designated to be used, it can be countermeasured by switching to a manual focus mode.

The priority order of the focus detection units can be changed through operation of the operation member. It is possible to change the priority for a focus detection unit from an undesired subject to a desired subject and have a focus detection on the desired subject designated to have priority.

In the embodiments described above, the focus detection areas intersect each other proximate the image field. As long as the focus detection areas are provided in tangential and in radial directions, it is not necessary that they actually intersect. However, it is advantageous to have the two focus detection areas as close to each other as possible, since the further away from each other they are, the areas compete with the photographer's selection subject choice. However, the invention is also applicable to a focus detection device, where a plurality of focus detection areas are provided in arbitrary directions and at arbitrary positions on an image field containing the field center 302. In that situation, the focus detection operation in the tangential direction area would have priority over the radial focus detection operation area. Further, the operation should adopt, as the final focus detection result, the closest or average value between the focus detection results of the focus detection area determined to conduct focus detection.

Two focus detection areas are described in the above embodiment, but the number of focus detection areas is not limited by the described embodiment. The number of focus detection areas can be more than two. Further, it is not necessary that the areas be placed strictly in tangential and radial directions. The device is equally effective with the areas in any orientation, as long as the focus detection or placement direction, with respect to the field center of the two areas is different and a difference exists between the eclipse in the focus detection light rays in both focus detection areas.

The device uses photo-electric conversion by two focus detection units. Focus detection algorithm processing is then conducted, to determine the priority of each of operation of the focus detection units. It is equally effective to perform the photo-electric conversion and the focus detection algorithm operation on the other focus detection unit, after determining that focus detection by the focus detection unit, designated having priority, is impossible.

While this invention has been described in conjunction with specific embodiments thereof, is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus detection device for a photo-optical system, the photo-optical system defining an image field and an optical axis, the device comprising:

a first focus detection area being provided on the image field of the photo-optical system, without containing an intersection of the image field and the optical axis, and also being provided tangentially oriented with respect to concentric circles centered at the intersection;

a second focus detection area being provided on the image field, without containing the intersection, and also being provided radially oriented with respect to concentric circles centered at the intersection;

first focus detection means for detecting the focus adjustment condition of the photo-optical system in the first focus detection area using a pair of light rays that pass through the photo-optical system;

second focus detection means for detecting the focus adjustment condition of the photo-optical system in the second focus detection area using another pair of light rays that pass through the photo-optical system; and control means for causing the focus detecting of the first focus detection means to have priority over the focus detecting of the second focus detection means and for detecting the focus adjustment condition of the photo-optical system in the first focus detection area.

2. The device according to claim 1, wherein the first focus detection means and the second focus detection means also determines if a focus determination is possible in each area, wherein the control means causes the focus detection operation of the second focus detection means to have priority over the focus detection of the first focus detection means when focus detection by the first focus detection means is not possible.

3. The device according to claim 1, wherein the first focus detection area and the second detection are formed in strips.

4. The device according to claim 3, wherein the strip of the first focus detection area and the strip of the second detection area intersect perpendicularly.

5. A focus detection device for a photo-optical system defining an image field and an optical axis, the device including:

a plurality of focus detection areas provided on the image field;

a plurality of focus detection means for the detecting the focus adjustment condition of the photo-optical system in each of the plurality of detection areas, the focus detection means detecting the focus adjustment condition using separate pairs of focus detection light rays passing through the photo-optical system for each of the plurality of focus detection areas;

the focus detection determining means also detecting an eclipse in each of the pair of light rays in each of the plurality of focus detection areas based on photo-optical system data, and the focus detection determining means also determining, based on a level of eclipse, whether focus detection in each of the plurality of focus detection areas is possible; and control means for causing the focus detection operation of the individual focus detection means determined to be able to conduct focus detection to have priority over the remaining plurality to focus detection means and detect the focus adjustment condition of the photo-optical system before the focus detection operation of the remaining plurality to focus detection means.

6. The device according to claim 5, wherein said control means adopts the results of the focus detection by another of focus detection means other that the individual focus detection means, when focus detection by said individual focus detection means is not possible.

7. A focus detection device for a photo-optical system defining an optical axis and having at least one image sensor, the device comprising:

a first focus detection area being provided on an image field of the photo-optical system without containing an intersection of the image field and the optical axis and also being provided tangentially oriented with respect to concentric circles centered at the intersection;

a second focus detection area being provided on the image field without containing the intersection and also being radially oriented with respect to concentric circles centered at the intersection;

first focus detection means for detecting the focus adjustment condition of the photo-optical system in the first focus detection area, the first focus detection means photo-optically receiving a pair of images formed by a pair of light rays that pass through the image sensor, the first focus detection means detecting a focus adjustment condition of the photo-optical system in the first focus detection area by mathematically processing the output signal of the image sensor; and second focus detecting means for detecting the focus adjustment condition of the photo-optical system in the second focus detection area, the second focus detection means using another pair of light rays that pass through the image sensor, the second focus detection means detecting the focus adjustment condition of the photo-optical system in a second focus detection area by mathematically processing the output signal of the image sensor;

wherein mathematical processing by the first focus detection means differs from mathematical processing by the second focus detection means.

8. The device according to claim 7, wherein the mathematical processing of the second focus detection means includes filter processing for suppressing low frequency components of the output signal of the image sensor.

9. The device according to claim 7, wherein the mathematical processing of the first focus detection means includes filter processing for suppressing high frequency components of the output signal of the image sensor.

10. A focus detection device for detecting the focus adjustment condition of an optical system, the system defining a subject image on an image field and having an optical axis, the device comprising:

first focus detection means for detecting the focus adjustment condition of the optical system in a strip type first focus detection area provided on the image field;

a second focus detection means for detecting the focus adjustment condition of the optical system in a strip type second focus detection area provided on the image field; and controlling means for causing the focus detection operation of the first focus detection means to have priority over the focus detecting of the second focus detection means and for detecting the focus adjustment condition of the photo-optical system in the strip type first focus detection area, wherein an angle formed by a line connecting the mid-point of the strip type first focus detection area and the intersection of the image field and the optical axis of the photo-optical system and a line extending in the longitudinal direction of the first detection area is larger than an angle formed by a line connecting a mid-point of the strip type second focus detection area and the intersection and a line extending in the longitudinal direction of the second focus detection area.

11. A focus detection device for detecting the focus adjustment condition of an optical system, the system defining a subject image on an image field and having at least two pair of pupil areas and an optical axis, the device comprising:

first focus detection means for detecting the focus adjustment condition of the optical system in a strip type first focus detection area provided on the image field based on positions of a pair of subject images formed by light rays passing through a first pair of pupil areas;

second focus detection means for detecting the focus adjustment condition of the optical system in a strip type second focus detection area provided on the image field based on positions of another pair of subject images formed by light rays that pass through a second pair of pupil areas; and controlling means for causing the focus detection of the first focus detection means to have priority over the focus detection operation of the second focus detection means and for detecting the focus adjustment condition of the photo-optical system in the first focus detection area, wherein an angle formed by a line connecting a mid-point of the first focus detection area and the intersection of the image field and the optical axis and a line that connects centers of the first pair of pupil areas is larger than an angle formed by a line connecting a mid-point of the second focus detection area and the intersection and a line connecting the centers of the second pair of pupil areas.

12. The device according to claim 11, wherein the first and the second focus detection areas are formed in perpendicular strips.

13. A focus detection device for detecting the focus adjustment condition of an optical system, the system forming a subject image on an image field, and having an optical axis, the device comprising;

a first image sensor for receiving light rays that pass through the optical system and generating an output signal based on an amount of light received;

first focus detection means for mathematically processing the output signal of the first image sensor and for detecting the focus adjustment condition in a strip type first focus detection area;

a second image sensor for receiving light rays that pass through the optical system and generating an output signal based on the amount of light received; and second focus detection means for mathematically processing the output signal of the second image sensor and for detecting the focus adjustment condition in a strip type second focus detection area provided on the image field, wherein an angle formed by a line connecting a mid-point of the first focus detection area and the intersection of the image field and the optical axis and a line extending in the longitudinal direction of the first focus detection area is larger than an angle formed by a line connecting the mid-point of the second focus detection area and the intersection and a line extending in the longitudinal direction of the second focus detection area and the mathematical processing by the first focus detection means differs from the mathematical processing by the second focus detection means.

14. A focus detection device for detecting the focus adjustment condition of an optical system, the system forming a subject image on an image field and having an optical axis and at least two pair of optical areas, the device comprising:

first focus detection means for photo-optically receiving a pair of subject images formed by light rays that pass through a first pair of pupil areas to a first focus detection area, the first focus detection means receiving the light rays in a first image sensor positioned in the first focus detection area, the first focus detection means calculating the positions of the subject images by mathematically processing the output signal of the first image sensor and detecting the focus adjustment condition in the strip type first focus detection area; and second focus detection means for photo-optically receiving a pair of subject images formed by light rays that pass through a second pair of second pupil areas in the optical system to a second focus detection area, the second focus detection means receiving the pair of subject images in a second image sensor, the second focus detection means calculating the positions of the subject image by mathematically processing the output signals of the second image sensor and detecting the focus adjustment condition in the second focus detection area;

wherein an angle formed on the image field by a line connecting a mid-point of the first focus detection area and the intersection of the image field and the optical axis of the photo-optical system and a line that connects the centers of the first pair of pupil areas is larger than an angle formed by a line connecting a mid-point of the second focus detection area and the intersection and a line that connects the centers of the second pair of pupil areas, the mathematical processing by the first focus detection means differs from the mathematical processing by the second focus detection means.

15. A focus detection device for detecting a focus adjustment image of an optical system, the optical system forming the subject image on an image field and having an optical axis, the device comprising:

first focus detection means for detecting the focus adjustment condition of the optical system in a first focus detection area provided on the image field;

second focus detection means for detecting the focus adjustment condition of the optical system in a strip type second focus detection area provided on the image field; wherein one of the first and second focus detection means normally has priority of operation over the other of the first and second focus detection means;

manual operating means for operation of the optical system; and controlling means for changing the priority of operation of the first detection means and the second focus detection means, the priority being changed based on the operation as set by the manual operating means.

16. A focus detection device for detecting the focus adjustment condition of an optical system, the optical system defining a subject image on an image field and defining an optical axis, the device comprising:

first focus detection means for detecting a focus adjustment condition of the optical system in a first focus detection area provided on the image field;

second focus detection means for detecting the focus adjustment condition of the optical system in a second focus area provided on the image field;

manual operating means for operation of the optical system; and controlling means for controlling the priority order of the focus detection operation of the first and second focus detection means based on the operation of the manual operating means;

display means for displaying the priority order set by the controlling means.

17. The device according to claim 16, wherein the control means determines if focus detection is possible in each of the first and second focus detection areas and the display means will not display the strip representing the area if focus detection is not possible in the area.

18. The device according to claim 16, wherein the control means determines if focus detection is possible in each of the first and second focus detection areas, the display means will flash the strips representing the areas if focus detection is not possible in the areas.

19. A focus detection device for detecting the focus adjustment condition of an optical system, the optical system defining a subject image on an image field and having an optical axis and at least one pair of pupil areas, the device comprising:

focus detection means for detecting the focus adjustment condition of the optical system in a focus detection area provided on the image field, the focus detection area formed based on the positions of a pair of subject images formed by light rays that pass through the at least one pair of pupil areas;

eclipse detection means for detecting whether an eclipse is formed by the light rays that pass through the pair of pupil areas and reach the focus detection area; and display means for displaying the result of detecting by the eclipse detecting means.

20. A method of focus detection in a photo-optical system, the photo-optical system defining an image field and an optical axis, the method including the steps of:

detecting a focus adjustment condition of the photo-optical system in a first focus detection area using a pair of light rays that pass through the photo-optical system; the first focus detection area being provided on the image field of the photo-optical system, without containing an intersection of the image field and the optical axis, and also being provided tangentially oriented with respect to concentric circles centered at the intersection;

detecting a focus adjustment condition of the photo-optical system in a second focus detection area using another pair of light rays that pass through the photo-optical system; the second focus detection area being provided on the image field, without containing the intersection, and also being provided radially oriented with respect to concentric circles centered at the intersection; and controlling the focus detecting of the first focus detecting step to have priority over the focus detecting of the second focus detecting step and for detecting the focus adjustment condition of the photo-optical system in the first focus detection area.

21. The method according to claim 20, wherein the first focus detecting step and the second focus detecting step also determine if a focus determination is possible in each area, wherein the controlling step further causes the focus detection operation of the second focus detecting step to have priority over the focus detection of the first focus detecting step when focus detection by the first focus detecting step is not possible.

22. A method of focus detection in a photo-optical system defining an image field and an optical axis, the method including the steps of:

detecting the focus adjustment condition of the photo-optical system in each of a plurality of detection areas provided on the image field, detecting the focus adjustment condition using a separate pairs of focus detection light rays passing through the photo-optical system for each of the plurality of focus detection areas;

detecting an eclipse in each of the pair of light rays in each of the plurality of focus detection areas based on photo-optical system data, and also determining, based on a level of eclipse, whether focus detection in each of the plurality of focus detection areas is possible; and controlling the focus detection operation of the individual focus detecting step determined to be able to conduct focus detection to have priority over the remaining plurality to focus detecting steps and detect the focus adjustment condition of the photo-optical system before the focus detection operation of the remaining plurality to focus detecting steps.

23. The method according to claim 22, wherein the controlling step also adopts the results of the focus detection by another of focus detecting step other that the individual focus detecting step when focus detection by said individual focus detecting step is not possible.

24. A method of focus detection in a photo-optical system defining an optical axis and having at least one image sensor, the method including the steps of:

detecting the focus adjustment condition of the photo-optical system in a first focus detection area, the first focus detection area being provided on an image field of the photo-optical system without containing an intersection of the image field and the optical axis and also being provided tangentially oriented with respect to concentric circles centered at the intersection; the detecting step further including the step of photo-optically receiving a pair of images formed by a pair of light rays that pass through the image sensor, the detecting step also detecting a focus adjustment condition of the photo-optical system in the first focus detection area by mathematically processing the output signal of the image sensor; and detecting the focus adjustment condition of the photo-optical system in a second focus detection area, the second focus detection area being provided on the image field without containing the intersection and also being radially oriented with respect to concentric circles centered at the intersection; the second focus detecting step using another pair of light rays that pass through the image sensor, the second focus detecting step also detecting the focus adjustment condition of the photo-optical system in a second focus detection area by mathematically processing the output signal of the image sensor, wherein mathematical processing by the first focus detecting step differs from mathematical processing by the second focus detecting step.

25. The method according to claim 24, wherein the mathematical processing of the second focus detecting step further suppresses low frequency components of the output signal of the image sensor.

26. The method according to claim 24, wherein the mathematical processing of the first focus detecting step further suppresses high frequency components of the output signal of the image sensor.

27. A method of detecting the focus adjustment condition of an optical system, the system defining a subject image on an image field and having an optical axis, the method including the steps of:

detecting the focus adjustment condition of the optical system in a strip type first focus detection area provided on the image field;

detecting the focus adjustment condition of the optical system in a strip type second focus detection area provided on the image field; and controlling the focus detection operation of the first focus detecting step to have priority over the focus detecting of the second focus detecting step and for detecting the focus adjustment condition of the photo-optical system in the strip type first focus detection area, wherein an angle formed by a line connecting the mid-point of the strip type first focus detection area and the intersection of the image field and the optical axis of the photo-optical system and a line extending in the longitudinal direction of the first detection area is larger than an angle formed by a line connecting a mid-point of the strip type second focus detection area and the intersection and a line extending in the longitudinal direction of the second focus detection area.

28. A method of detecting the focus adjustment condition of an optical system, the system defining a subject image on an image field and having at least two pair of pupil areas and an optical axis, the method including the steps of:

detecting the focus adjustment condition of the optical system in a strip type first focus detection area provided on the image field based on positions of a pair of subject images formed by light rays passing through a first pair of pupil areas;

detecting the focus adjustment condition of the optical system in a strip type second focus detection area provided on the image field based on positions of another pair of subject images formed by light rays that pass through a second pair of pupil areas; and controlling the focus detection of the first focus detecting step to have priority over the focus detection operation of the second focus detecting step and for detecting the focus adjustment condition of the photo-optical system in the first focus detection area, wherein an angle formed by a line connecting a mid-point of the first focus detection area and the intersection of the image field and the optical axis and a line that connects centers of the first pair of pupil areas is larger than an angle formed by a line connecting a mid-point of the second focus detection area and the intersection and a line connecting the centers of the second pair of pupil areas.

29. A method of detecting the focus adjustment condition of an optical system, the system forming a subject image on an image field, and having an optical axis, the method including the steps of:

receiving light rays that pass through the optical system in a first image sensor, generating an output signal based on an amount of light received;

mathematically processing the output signal of the first image sensor and for detecting the focus adjustment condition in a strip type first focus detection area;

receiving light rays that pass through the optical system in a second image sensor, generating an output signal based on the amount of light received; and mathematically processing the output signal of the second image sensor and for detecting the focus adjustment condition in a strip type second focus detection area provided on the image field, wherein an angle formed by a line connecting a mid-point of the first focus detection area and the intersection of the image field and the optical axis and a line extending in the longitudinal direction of the first focus detection area is larger than an angle formed by a line connecting the mid-point of the second focus detection area and the intersection and a line extending in the longitudinal direction of the second focus detection area and the mathematical processing by the first focus detecting step differs from the mathematical processing by the second focus detecting step.

30. A method of detecting the focus adjustment condition of an optical system, the system forming a subject image on an image field and having an optical axis and at least two pair of optical areas, the method including the steps of:

photo-optically receiving a pair of subject images formed by light rays that pass through a first pair of pupil areas to a first focus detection area in a first image sensor positioned in the first focus detection area, calculating the positions of the subject images by mathematically processing the output signal of the first image sensor and detecting the focus adjustment condition;

photo-optically receiving a pair of subject images formed by light rays that pass through a second pair of second pupil areas in the optical system to a second focus detection area in a second image sensor;

calculating the positions of the subject image by mathematically processing the output signals of the second image sensor; and detecting the focus adjustment condition in the second focus detection area, wherein an angle formed on the image field by a line connecting a mid-point of the first focus detection area and the intersection of the image field and the optical axis of the photo-optical system and a line that connects the centers of the first pair of pupil areas is larger than an angle formed by a line connecting a mid-point of the second focus detection area and the intersection and a line that connects the centers of the second pair of pupil areas, the mathematical processing by the first detecting step differing from the mathematical processing by the second focus detecting step.

31. A method of detecting a focus adjustment image of an optical system, the optical system forming the subject image on an image field and having an optical axis, the method including the steps of:

detecting the focus adjustment condition of the optical system in a first focus detection area provided on the image field;

detecting the focus adjustment condition of the optical system in a strip type second focus detection area provided on the image field; wherein one of the first and second focus detecting steps normally has priority of operation over the other of the first and second focus detecting steps;

manually controlling the operation of the optical system; and controlling the priority of operation of the first focus detecting and the second focus detecting step, the priority being changed based on the operation as set by the manually controlling step.

32. A method of detecting the focus adjustment condition of an optical system, the optical system defining a subject image on an image field and defining an optical axis, the method including the steps of:

detecting a focus adjustment condition of the optical system in a first focus detection area provided on the image field;

detecting the focus adjustment condition of the optical system in a second focus area provided on the image field;

manually controlling the operation of the optical system; and controlling the priority order of the focus detection operation of the first and second focus detecting step based on the operation of the manually controlling step; and displaying the priority order set by the controlling step.

33. The method according to claim 32, wherein the first and second focus detection areas are formed as strips perpendicular to each other and the displaying step displays the areas as perpendicular strips.

34. The method according to claim 32, wherein the displaying step displays the area having priority as a thickened strip.

35. The method according to claim 32, wherein the controlling step also determines if focus detection is possible in each of the first and second focus detection areas, the displaying step will not display the strip representing the area if focus detection is not possible in the area.

36. The method according to claim 32, wherein the controlling step further determines if focus detection is possible in each of the first and second focus detection areas, the displaying step will flash the strips representing the areas if focus detection is not possible in the areas.

\* \* \* \* \*